(12) United States Patent
Hu et al.

(10) Patent No.: US 7,234,942 B2
(45) Date of Patent: Jun. 26, 2007

(54) SUMMARISATION REPRESENTATION APPARATUS

(75) Inventors: Jiawei Hu, Bracknell (GB); Peter Michael Allday, Bracknell (GB)

(73) Assignee: Canon Kabushiki Kaisha, Tokyo (JP)

( * ) Notice: Subject to any disclaimer, the term of this patent is extended or adjusted under 35 U.S.C. 154(b) by 489 days.

(21) Appl. No.: 10/609,419

(22) Filed: Jul. 1, 2003

(65) Prior Publication Data
US 2004/0029085 A1    Feb. 12, 2004

(30) Foreign Application Priority Data
Jul. 9, 2002    (GB)    ............................... 0215853.3

(51) Int. Cl.
*G09B 17/00*    (2006.01)
(52) U.S. Cl. .................................... 434/178
(58) Field of Classification Search ................ 434/178, 434/236, 128, 343, 350–354, 362; 273/236, 273/242, 243, 248, 269
See application file for complete search history.

(56) References Cited

U.S. PATENT DOCUMENTS

| | | | | |
|---|---|---|---|---|
| 5,083,268 A | * | 1/1992 | Hemphill et al. ............... | 704/9 |
| 5,321,608 A | * | 6/1994 | Namba et al. .................. | 704/9 |
| 5,619,709 A | * | 4/1997 | Caid et al. ...................... | 704/9 |
| 5,644,776 A | | 7/1997 | DeRose et al. ............. | 395/761 |
| 5,708,825 A | | 1/1998 | Sotomayor .................. | 395/762 |
| 5,838,323 A | * | 11/1998 | Rose et al. .................. | 715/526 |
| 5,867,164 A | * | 2/1999 | Bornstein et al. ........... | 715/530 |
| 5,918,240 A | | 6/1999 | Kupiec et al. ............... | 707/531 |
| 5,924,108 A | | 7/1999 | Fein et al. ................... | 707/531 |
| 5,963,965 A | * | 10/1999 | Vogel ............................. | 707/3 |
| 6,167,368 A | * | 12/2000 | Wacholder ...................... | 704/9 |
| 6,185,592 B1 | | 2/2001 | Boguraev et al. ........... | 707/531 |
| 6,205,456 B1 | * | 3/2001 | Nakao ......................... | 715/531 |
| 6,317,708 B1 | * | 11/2001 | Witbrock et al. ............... | 704/9 |
| 6,353,824 B1 | | 3/2002 | Boguraev et al. .............. | 707/5 |
| 6,493,663 B1 | * | 12/2002 | Ueda ............................. | 704/9 |
| 6,533,822 B2 | * | 3/2003 | Kupiec ....................... | 715/531 |
| 6,581,057 B1 | * | 6/2003 | Witbrock et al. ............... | 707/5 |
| 6,820,237 B1 | * | 11/2004 | Abu-Hakima et al. ...... | 715/531 |

(Continued)

FOREIGN PATENT DOCUMENTS

EP    1 033 662 A2    9/2000

(Continued)

OTHER PUBLICATIONS

Vergne, J. "Tutorial: Trends in Robust Parsing", Jul. 29, 2000.

(Continued)

*Primary Examiner*—Robert E Pezzuto
(74) *Attorney, Agent, or Firm*—Fitzpatrick, Cella, Harper & Scinto

(57) ABSTRACT

At least one topic in text data is determined by a topic determiner (4). A topic thread determiner (5) identifies in the text data context data associated with the at least one determined topic and provides topic representation data defining a graphical representation of the at least one topic in which are distributed visual indicia representing at least some of the context data with the distribution of the visual indicia indicating the positions within the text of the corresponding context data. The topic thread determiner (5) provides the topic representation data for display to a user on a display.

36 Claims, 15 Drawing Sheets

U.S. PATENT DOCUMENTS

| | | | | |
|---|---|---|---|---|
| 6,823,331 | B1* | 11/2004 | Abu-Hakima | 707/3 |
| 6,963,830 | B1* | 11/2005 | Nakao | 704/1 |
| 6,985,864 | B2* | 1/2006 | Nagao | 704/260 |
| 7,024,658 | B1* | 4/2006 | Cohen et al. | 717/117 |
| 2002/0184267 | A1 | 12/2002 | Nakao | 707/515 |
| 2003/0028558 | A1 | 2/2003 | Kawatani | 707/500 |
| 2003/0130837 | A1* | 7/2003 | Batchilo et al. | 704/9 |

FOREIGN PATENT DOCUMENTS

| | | |
|---|---|---|
| EP | 1 071 023 A2 | 1/2001 |
| EP | 1 217 533 A2 | 6/2002 |
| EP | 1 233 349 A2 | 8/2002 |
| GB | 2 332 544 A | 6/1999 |
| JP | 2-254566 | 10/1990 |
| JP | 5-158401 | 6/1993 |
| JP | 2000-200290 | 7/2000 |

OTHER PUBLICATIONS

Miller, George A., et al., "Introduction to WordNet: An On-line Lexical Database", Cognitive Science Laboratory, Princeton University, Aug. 1993 (http://www.cogsci.princeton.edu/~wn/).

Barzilay, R., et al. "Using Lexical Chains for Text Summarization", Proceedings of the Intellig nt Scalable Text Summarization Workshop, Madrid 1997.

Barzilay, R., "Lexical Chains for Summarization", M. Sc. Thesis, Ben-Gurion University of th Negev, Department of Mathematics & Computer Science, Nov. 30, 1997.

Edmundson, H.P., "New Methods in Automatic Extracting", pp. 23-43 of "Advances in Automatic Text Summarisation" by Mani and Maybury, 1999.

Johnson, F.C., et al., "The application of linguistic processing to automatic abstract generation", Journal of Document & Text Management, vol. 1, No. 3, 1993, pp. 215-241.

Boguraev, B., et al., "Dynamic Presentation of Document Content for Rapid On-Line Skimming", AAAI Spring 1998 Symposium on Intelligent Text Summarization, Spring 1998.

I. Mani et al., "Multi-document Summarization by Graph Search and Matching", available at http://arxiv.org.PS_cache/cmp-lg/pdf/9712/9712004.pdf, Proceedings of the Fourteenth National Conference on Artificial Intelligence (AAAI'97), Dec. 10, 1997, pp. 622-628.

D. Lawrie et al., "Finding Topic Words for Hierarchical Summarization", SIGIR '01, Sep. 9-12, 2001, New Orleans, LA, pp. 349-357 and presentation slides.

Roget's on-line thesaurus, available at http://humanities.uchicago.edu/orgs/ARTEL/forms_unrest/Roget.html.actual (date unknown).

Swan, R., et al., "TimeMines: Constructing Timelines with Statistical Models of Word Usage", ACM SIGKDD 2000, Workshop on Text Mining, pp. 73-80, CIIR Technical Report IR-213, (2000) available at http://ciir.cs.umass.edu.

"NP Chunking", available at http://lcg-www.uia.ac.be/~erikt/research/np-chunking.html, Sep. 13, 2002.

I. Mani et al., "Automatic Summarization", Chapter 4, John Benjamin Publishing Company, 2001, pp. 77-89.

S. Evert et al., "Methods for Qualitative Evaluation of Lexical Association Measures", Proceedings of the 39th Annual Meeting of the Association for Computational Linguistics, Toulouse, France, 2001.

D. Lin et al., presentation slides entitled "Collocation", Department of Computing Science, University of Alberta, Feb. 5, 2002.

T. Dunning, "Accurate Methods for the Statistics of Surprise and Coincidence", Computational Linguistics 19(1), 1993, available at http://citeseer.nj.nec.com/dunning93accurate/html.

"The Festival Speech Synthesis System", Section 9.1 of the manual for that system, Nov. 20, 2002, available at http://www.cstr.ed.ac.uk/projects/festival/manual/festival_9.html.

M.A. Hearst, "Multi-Paragraph Segmentation of Expository Text", 32nd Annual Meeting of the Association for Computational Linguistics in 1994, available at http://citeseer.nj.nec.com/hearst94multiparagraph.html.

Armour, T., presentation slides entitled "Asymmetric Threat Initiative", 2000, available at http://www.darpa.mil/darpatech2000/presentations/iso.pdf/4armouratb&wrev1.pdf.

Armour, T., "Asymmetric Threat Initiative", 2000, available at http://www.darpa.mil/body/dar_archives.html.

\* cited by examiner

SUMMARISATION REPRESENTATION APPARATUS

BACKGROUND OF THE INVENTION

1. Field of the Invention

This invention relates to apparatus for enabling a user to extract salient information from a text.

2. Description of the Related Art

U.S. Pat. No. 6,167,368 describes a method and a system for identifying significant topics in a document. In this method, the document text is tagged with part-of-speech tags (POS tags) by use of a publically available part of speech tagger so that each word in the text is associated with a tag representing the corresponding part of speech. The tagged text is then parsed by a parser that operates to extract noun phrases and, after discarding duplicate entries and pronouns, the head of each noun phrase is detected and each newly detected head is assigned a group number. The noun phrases are then clustered into groups by head in accordance with the assigned group numbers and the clusters are ranked in accordance with the frequency of occurrence of the heads.

After the grouping and ranking, the method disclosed in U.S. Pat. No. 6,167,368 provides one of two different types of output mode. In a first output mode, the groups of noun phrases are output so that each phrase in a group is listed together with a sentence number and a sequential phrase identifier with the different groups being listed in order of frequency. In the other output mode, the method simply outputs a list of the head nouns with the frequency of occurrence of each head noun indicated in brackets after the head noun.

SUMMARY OF THE INVENTION

In one aspect, the present invention provides apparatus for providing a user with a visual representation of main topics and their context within a text.

In one aspect, the present invention provides apparatus for providing a user with a graphical representation that indicates a topic within a text and the relative locations within the text of context associated with that topic.

In one aspect, the present invention provides apparatus for identifying visually to a user the or each main topic within a text by defining a line for each topic and associating positions or nodes on the line with context data related to that topic, with the relative positions of context data on the line defining the relative positions within the text of the occurrence of that context data.

In one aspect, the present invention provides apparatus for providing a summary of a text, wherein the apparatus comprises: display means for providing a user with a visual representation of the or a number of topics identified in the text with each topic being associated with the context data related to that topic; selecting means for enabling a user to select context data; and summarising mean for summarising the text in accordance with the context data selected by the user.

Apparatus embodying the invention enables a user to be provided with a visual representation indicating the topic or topics within a text so that it is not necessary to display a lot of text to the user. This is particularly advantageous in the case of small portable or handheld apparatus such as personal digital assistants (PDAs) where the size of the display is small. In addition, apparatus embodying the invention enables a user to determine where in a document to look for text associated with a particular context, thereby increasing the speed and ease with which the user can then extract salient information from the text.

Also, the visual representation of the topics enables a user to rapidly glean the gist of a text.

Embodiments of the present invention will now be described by way of example, with reference to the accompanying drawings.

DETAILED DESCRIPTION OF THE INVENTION

Figure 1:
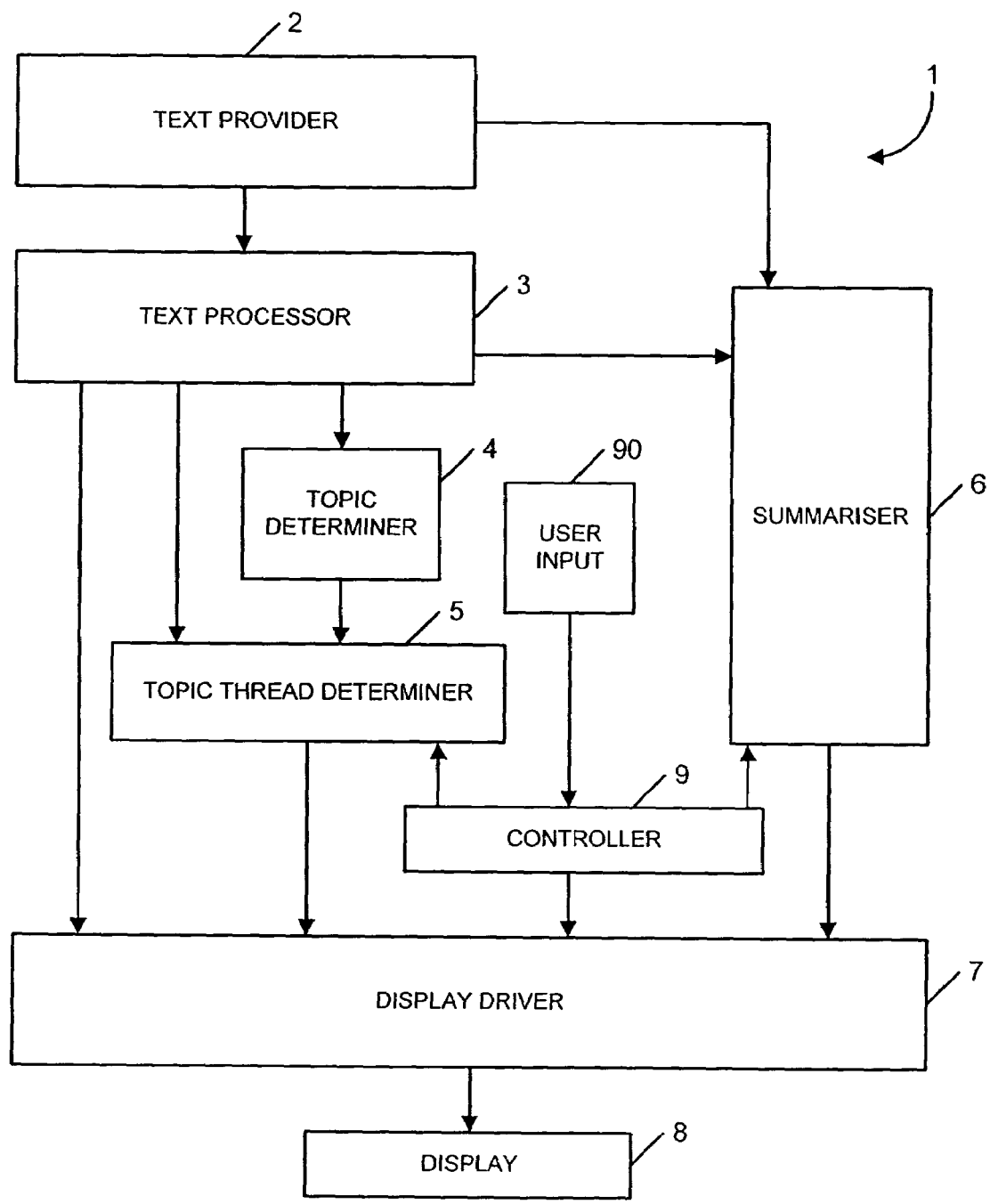
FIG. 1 shows a functional block diagram of summarisation apparatus embodying the present invention.

Referring now to the drawings, FIG. 1 shows a functional block diagram of summarisation apparatus 1 embodying the present invention.

The summarisation apparatus comprises a text provider 2 that provides text to be summarised in machine readable electronic form. The text provider 2 may be, for example, a hard disk or other mass storage device storing the text in electronic form. The text provider 2 is coupled to a text processor 3 that identifies and tags words within the text with their corresponding parts of speech (POS) tags and also identifies noun phrases within the text. The text processor 3 is coupled to a topic determiner 4 that determines from the tagged text the most frequently occurring or important topics within the text.

The topic determiner 4 is coupled to a topic thread determiner 5 that is also coupled to receive the output of the text processor 3 and that determines, for each of the topics determined by the topic determiner 4, the context data associated with that topic and defines a topic thread for that topic. The text processor 3 is also coupled to a summariser 6 which is configured to provide a summary of the text supplied to the text processor 3.

Each of the text processor 3, topic thread determiner 5 and summariser 6 is coupled to a display driver 7 that determines the information that will be displayed to a user on a display 8. In addition, the apparatus 1 includes a controller 9 and a user input 90 that enable the adjustment of, for example, a context data threshold of the topic thread determiner 5 and control of operation modes of the summariser 6 and the display driver 7.

Figure 2:
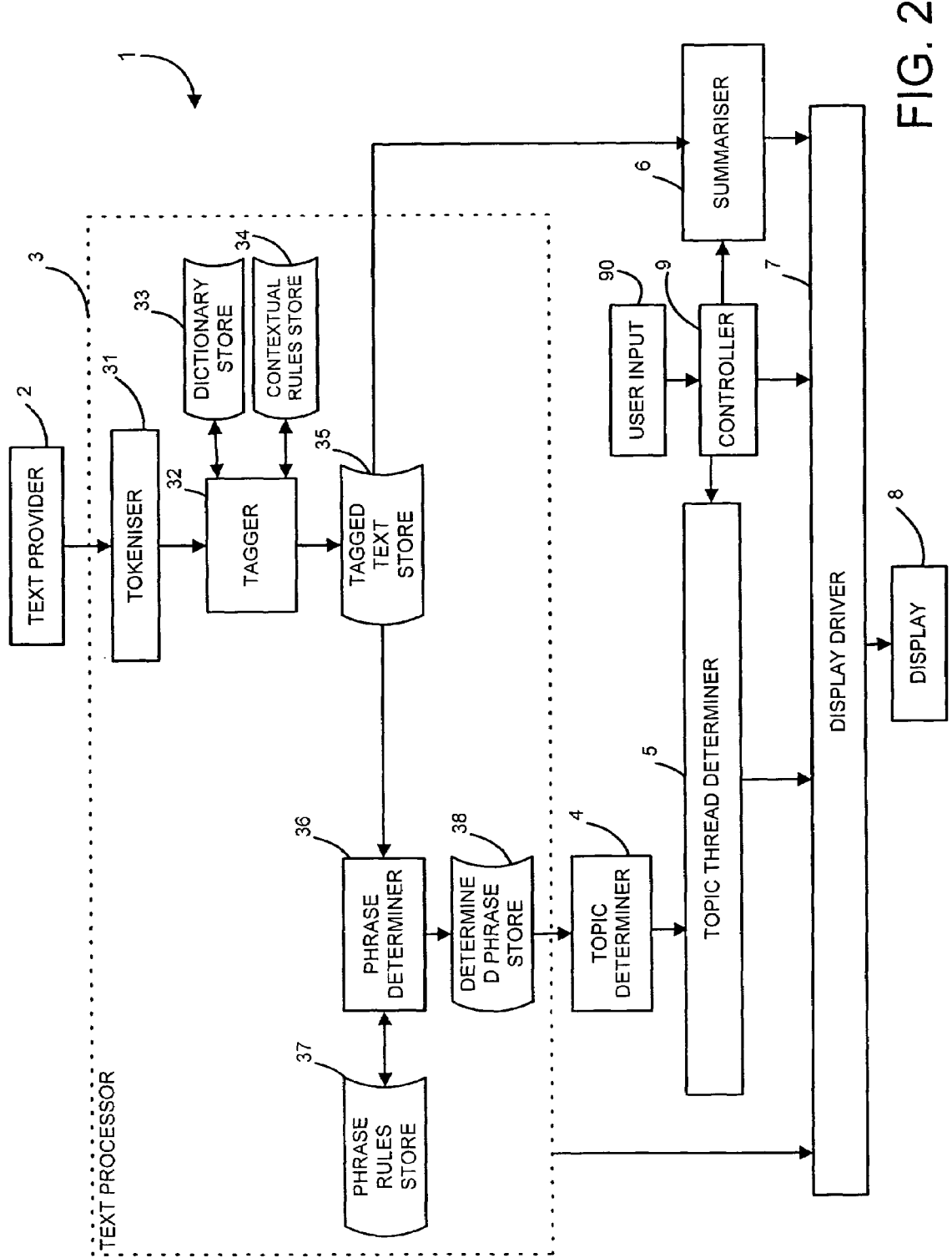
FIG. 2 shows a more detailed functional block diagram of the summarisation apparatus shown in FIG. 1.

FIG. 2 shows a more detailed functional block diagram of the summarisation apparatus 1 to illustrate functional elements of the text processor 3.

As can be seen from FIG. 2, the text processor 3 includes a tokeniser 31 that splits the text provided by the text provider 2 into words by identifying delimiters between the words in a known manner, for example by locating features indicative, in the language concerned, of word separators such as spaces and punctuation marks (for example full stops, commas and so on in English). This word data is supplied to a part-of-speech (POS) tagger 32 that tags each word with a tag identifying the corresponding part of speech. Examples of tags are:

ADJ—Adjective
NOUN—Noun
PREP—Preposition
DET—Determiner
VERB—Verb

The tagger 32 tags each word by looking up the word in a dictionary store 33 that identifies, for each word, the corresponding part-of-speech. Where a word may represent more than one part-of-speech (such as the word "order", which may be a noun or a verb), then the tagger 32 accesses contextual rules stored in a contextual rules store 34 to disambiguate the part-of-speech in accordance with its context. Known methods of carrying out this part-of-speech tagging are described in a tutorial entitled "Trends in Robust Parsing" by Jacques Vergne of the Université De Caen of France dated 29 Jul. 2000 and available at http://users.info.unicaen.fr/~jvergne/tutorialColing2000.html and http://users.info.unicaen. fr/~jvergne/RobustParsing/RobustParsingCourseSlides. pdf.zip.

Figure 3:
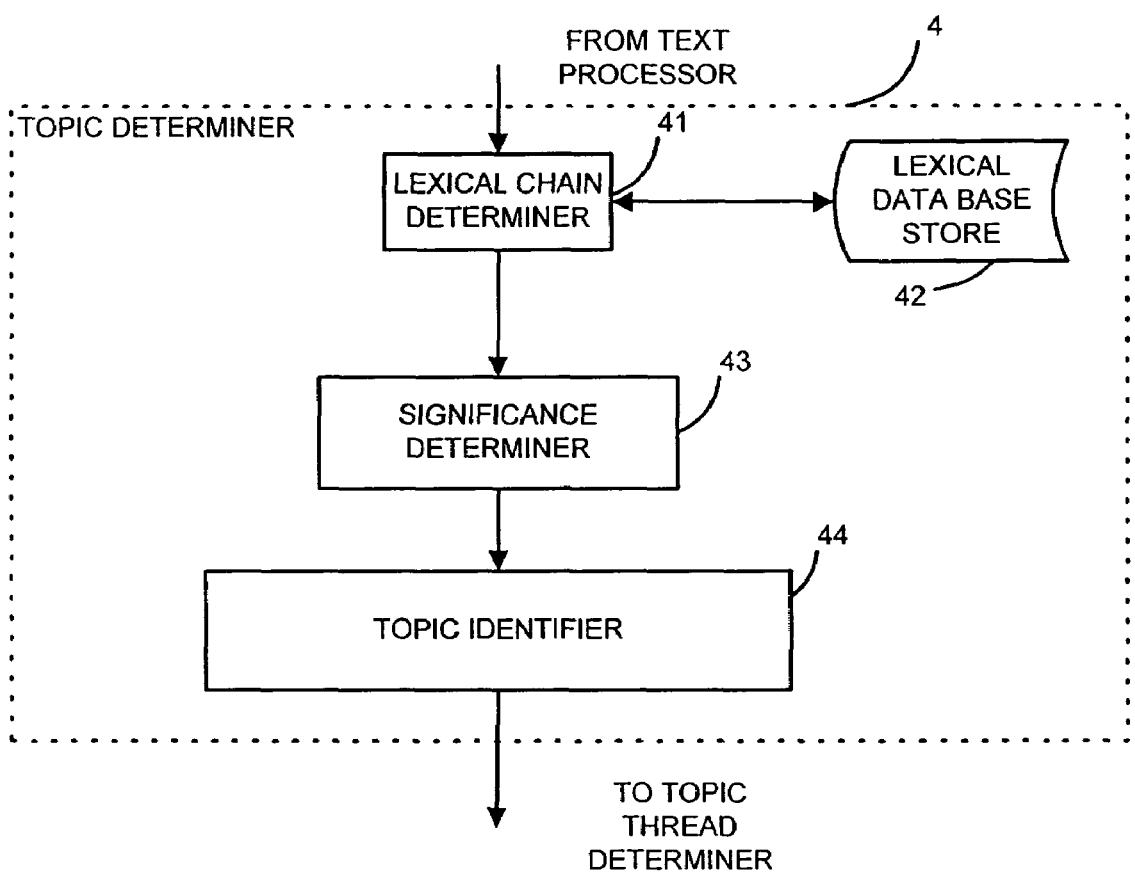
FIG. 3 shows a functional block diagram of a topic determiner shown in FIG. 1.

The tagged words are stored in a tagged text store 35 for access by a phrase determiner 36 which, using phrase rules stored in a phrase rule store 37, parses the tagged words data to identify noun phrases within the text and so to identify any context data associated with each occurrence in the tagged word text of a noun. Methods of carrying out this "chunking" are described in the aforementioned tutorial and also in EP-A-1033662, for example see the description with reference to FIGS. 3 to 5 of EP-A-1033662. The determined noun phrases are stored in a determined noun phrase store 38.

The text processor 3 thus derives from the text data provided by the text provider 2, tagged word data in which each word within the text is tagged or associated with data identifying the corresponding part-of-speech and in addition, noun phrase data identifying, for each noun in the tagged word data, any associated context data.

FIGS. 3, 4, 5 and 6 show functional block diagrams of the topic determiner 4, topic thread determiner 5, summariser 6 and display driver 7, respectively.

The topic determiner 4 has a lexical chain determiner 41 that determines lexical chains or relationships between nouns provided by the tagged text store 35 in accordance with data stored in a lexical database store 42. In this example, the lexical database is the "WordNet" lexical database of the English language supplied by the Cognative Science Laboratory of Princeton University 221 Nassau Street, Princeton, United States of America, available on-line via http://www.cogsci.princeton.edu/~wn/. The use of lexical chains for text summarisation is described in a paper by Regina Barzilay and Michael Elhadad of the Mathematics and Computer Science Department, Ben-Gurion University of the Negev, Israel entitled "Using Lexical Chains for Text Summarisation" and published in the Proceedings of the Intelligent Scalable Text Summarisation Workshop (ISTS '97), ACL Madrid 1997 and in Regina Barzilay's 1997 Masters thesis entitled "Lexical Chains for Summarisation" published by the Ben-Gurion University of the Negev, Beer-Sheva, Israel.

The WordNet lexical database divides the lexicon into five categories (nouns, verbs, adjectives, adverbs and function words) but contains only nouns, verbs, adjectives and adverbs. WordNet organises lexical information in terms of word meanings and resembles a thesaurus but in which word forms are represented as strings of ASCII characters and senses are represented by a "synset", that is a set of synonyms which refer to a common semantic concept. Where a word has more than one meaning, then it may be present in more than one synset. A list of pointers is attached to each synset which expresses relationships between synsets. These relationships include, as set out in the thesis of Regina Barzilay, words with opposite meaning (antonyms), generalisations of word (hypernyms), specifications of words (hyponyms), whole to part-whole correspondences (meronyms), part to part-whole relationships (holonyms), implied relations between nouns and adjectives (attributes), causes of other actions (causes) and implications of other actions (entailments). Thus, the WordNet lexical database defines sets of synonyms and relationships between synonyms.

Other forms of lexical databases such as Roget's on-line thesaurus may also be used.

The lexical chain determiner 41 checks each noun of the text provided by the text processor 2 using the lexical database to identify lexical chains within the text, that is nouns occurring at different points within the text that share a lexical relationship. In this case, the lexical chain determiner 41 identifies each occurrence of the same noun and, in addition, uses the lexical database to identify synonyms occurring within the text and also to identify hypernyms associated with nouns occurring in the text.

A significance determiner 43 determines the significance of each noun in the text by counting the number of times the noun occurs and allocating each occurrence of the noun with a weight depending upon the position of the noun within the text. Thus, in this example, the significance determiner 43 has a series of different weighting factors and is arranged to allocate the highest weighting factor to nouns occurring within the title of the text, a lower weighting factor to nouns occurring in an abstract or as keywords of the text, a lower weighting factor to nouns occurring in sub-titles of the text and a lowest weighting factor to a noun occurring in the body of the text. The significance determiner 43 may also be configured to allocate to words occurring in a summary at the end of the text a weighting factor similar to that for nouns occurring within an abstract.

The significance determiner 43 thus obtains a significance score for each noun identified within the text. In addition, the significance determiner 43 determines a significance score for each identified "synset" within the text by combining the significance scores for the nouns forming that synset and also obtains a significance score for each identified hypernym by, again, combining the significance scores for the nouns associated with that hypernym.

A topic identifier 44 is provided to determine the highest significance scores, in this case the three highest significance scores, and to identify as the main topics within the text the noun, synset or hypernym associated with these highest significance scores. Where a highest significance score is associated with a noun or hypernym then the topic will be labelled or identified by that noun or hypernym. Where a highest significance score is associated with a synset, then the topic determiner 44 identifies the topic by the most frequently occurring noun within the synset.

Figure 4:
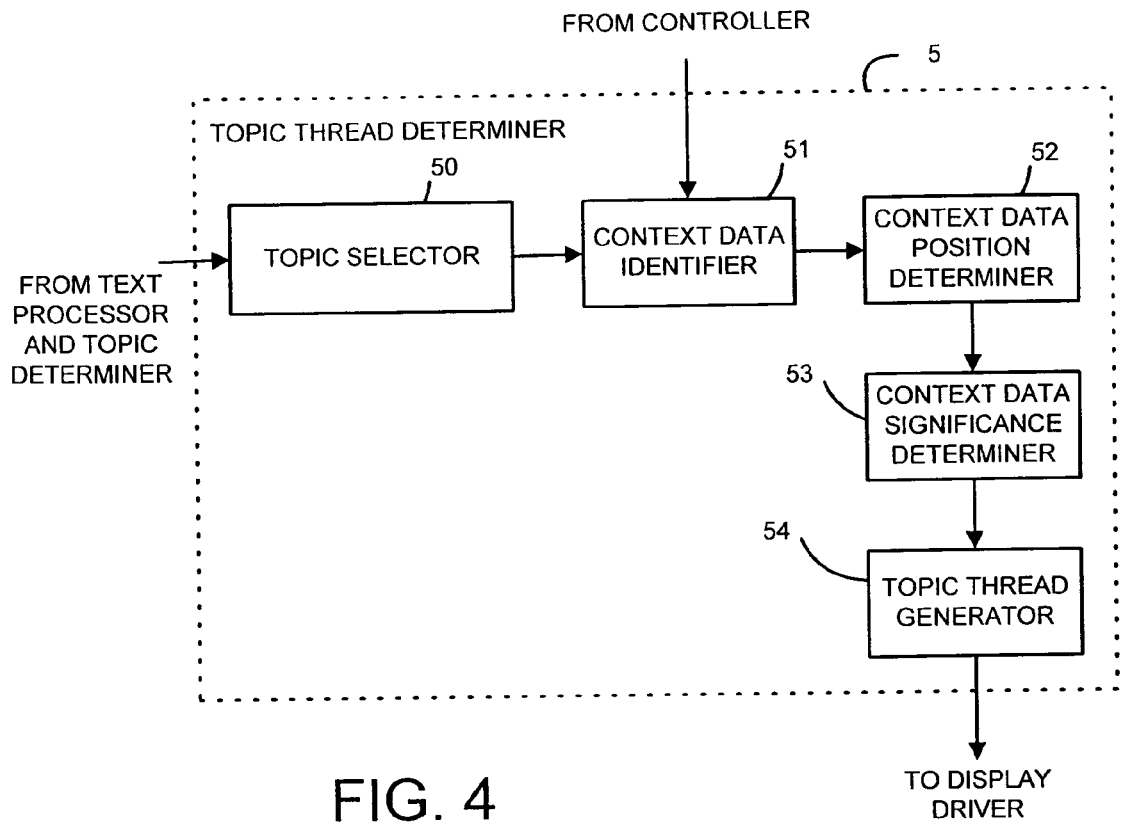
FIG. 4 shows a functional block diagram of a topic thread determiner shown in FIG. 1.

As shown in FIG. 4, the topic thread determiner 5 has a topic selector 50 that selects each of the topics determined by the topic determiner 4 in turn and causes, for each topic in turn, a context data identifier 51 to identify from the phrase data stored in the determined phrase store 38, the context data associated with each noun of that topic and a context data position determiner 52 that determines the position of that context data within the text, that is the number of words from the start of the text processed by the text processor.

The topic determiner 4 also includes a context data significance determiner 53 that determines the significance of particular context data for a topic and a topic thread generator 54 that generates data associating the context data of a particular topic with line data such that the relative positions of the context data within the text are indicated as nodes or markers along a line and the relative significance or dominance of the context data is visually indicated.

The context data significance determiner 53 functions in a manner similar to the significance determiner 43 in that the context data significance determiner counts the number of occurrences of the same context data for a given topic and may also apply a weighting factor to each occurrence dependent on its position in the text, for example as described above a higher weighting factor may be applied to context data in the title or abstract.

The topic thread determiner also may receive input from the controller 9, possibly via the user input provider 9 that, as will be described below, enables adjustment of the manner of visual representation.

Figure 5:
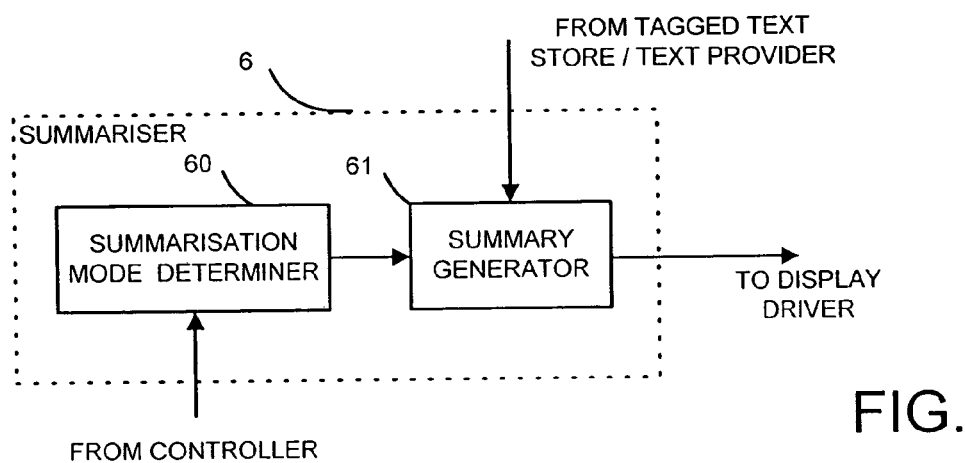
FIG. 5 shows a functional block diagram of a summariser shown in FIG. 1.

As shown in FIG. 5, the summariser 6 has a summarisation mode determiner 60 that determines, in accordance with data received from the controller 9, a summarisation mode and a summary generator 61 that generates a summary of the text for display to the user in accordance with the summary mode determined by the summary mode determiner 60. The summary mode may be a general summary mode in which the summary is determined using known methods as described a paper entitled "New Methods in Automatic Extracting" by H. P. Edmundson (1969) published in the Journal of the ACM 16(2) at pages 264 to 285 and in Mani and Maybury "Advances in Automatic Text Summarisation" 1999 at pages 23 to 42 or a paper entitled "The Application of Linguistic Processing to Automatic Abstract Generation" by Johnson et al published in the Journal of Document and Text Management, Volume 1, Number 3, 1993 at pages 215 to 241, or may be a user-defined summary as will be described below.

Figure 6:
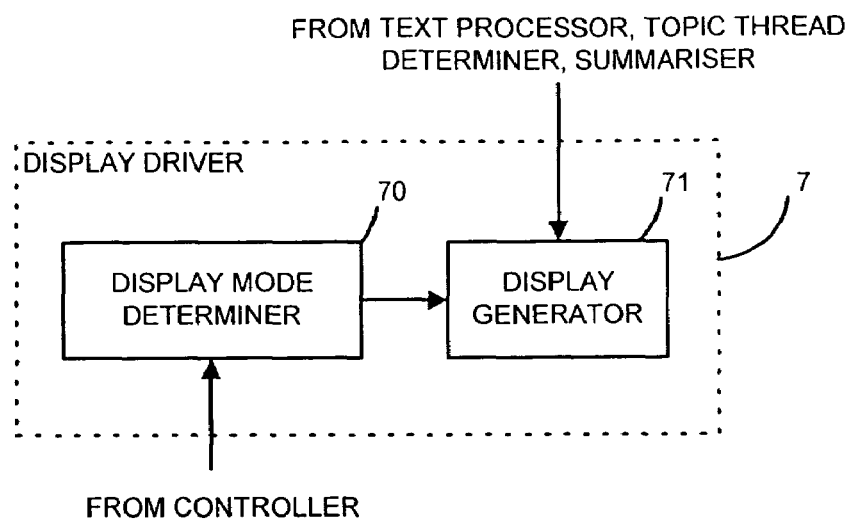
FIG. 6 shows a functional block diagram of a display driver shown in FIG. 1.

As shown in FIG. 6, the display driver 7 has a display mode determiner 70 that determines a display mode in accordance with data supplied by the controller 9 and a display generator or driver 71 for driving the display 8 in accordance with the determined mode.

The summarisation apparatus described above is implemented by computer apparatus programmed by program instructions. The computer apparatus may be for example, a personal computer, personal digital assistant (PDA) or a work station.

Figure 7:
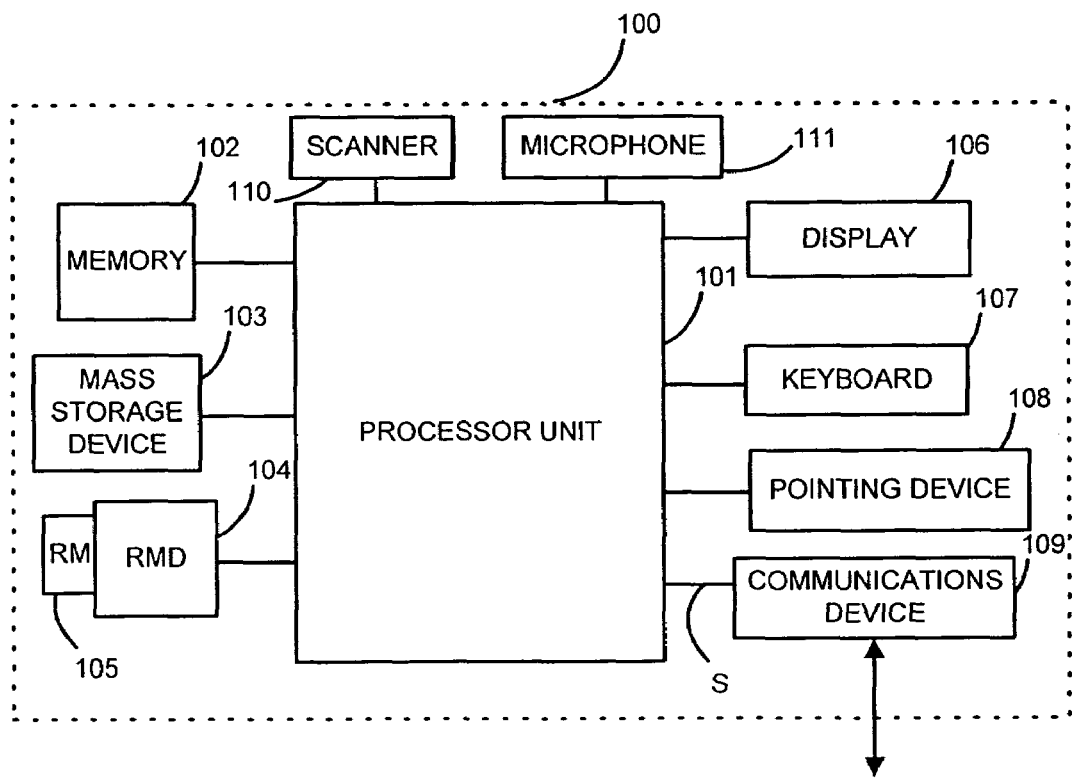
FIG. 7 shows a functional block diagram of computing apparatus that may be configured by program instructions to form one or more functional components of the summarisation apparatus shown in FIG. 1.

FIG. 7 shows a functional block diagram of a typical computing apparatus 100 that may be configured to implement the summarisation apparatus 1.

As shown in FIG. 7, the computing apparatus 100 includes a processor unit 101 associated with data storage in the form, as shown, of a memory 102 such as ROM, plus possibly also RAM, a mass storage device 103 such as a hard disk drive and a removable medium drive (RMD) 104 for receiving a removable medium (RM) 105 such as, for example, a floppy disk, CDROM, DVD or the like.

The computing apparatus 100 also has a user interface forming the user input 90. The user interface includes a display 106, a keyboard 107, a pointing device 108 such as a mouse or touch pad and possibly also a microphone 111. In addition, the computing apparatus may have a communications device 109 such as a modem or network card for enabling the computing apparatus to communicate with other computing apparatus over a network such as a local area network (LAN), wide area network (WAN), an intranet or the Internet. In addition, the computing apparatus 100 may include a scanner 110 for scanning hard copy documents to obtain electronic document text.

The computing apparatus 100 may be configured to provide the summarisation apparatus 1 shown in FIG. 1 by any one or more of the following:

1. program instructions pre-installed on the mass storage device 103;
2. program instructions downloaded from a removable medium 105;
3. program instructions downloaded as a signal S via the communications device 109.

Operation of the summarisation apparatus described above will now be explained.

Initially, upon receipt of an electronic text from the text provider 2, the tokeniser 31 identifies individual words in the text and the tagger 32 tags each word with its part-of-speech using the dictionary stored in the dictionary store 33 and the contextual rules stored in the contextual rule store 34. The tagged words are stored in the tagged text store 35 from which the phrase determiner 36 identifies, in accordance with the phrase rules stored in the phrase rule store 37 and as described in EP-A-1033662 (the whole contents of which are hereby incorporated by reference), noun phrases within the text and stores these in the determined phrase store 38.

Operation of the topic generating apparatus formed by the topic determiner 4 and topic thread determiner 5 will now be described with reference to the flow charts shown in FIGS. 8a, 8b and 9.

Figure 8A:
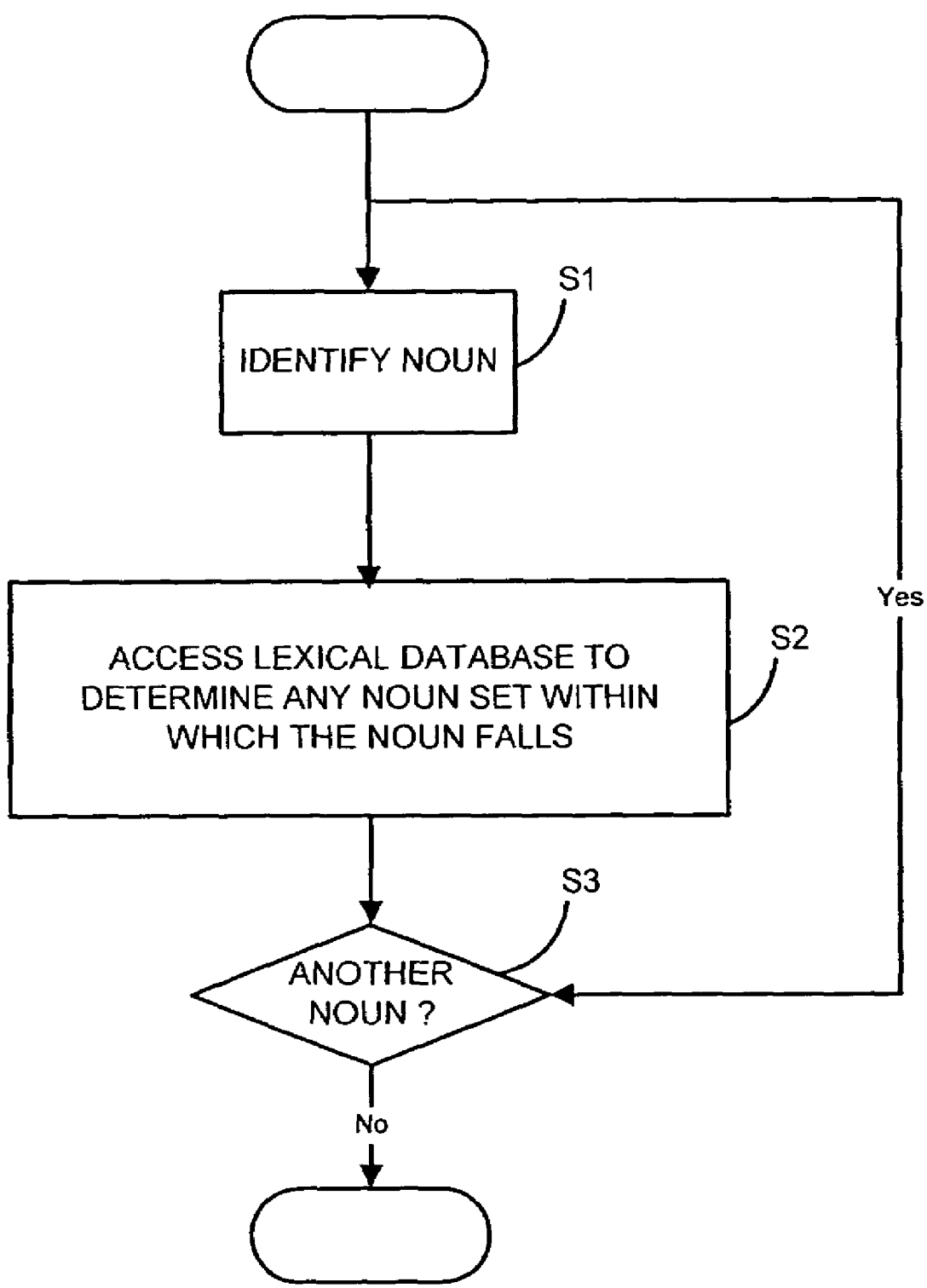
FIGS. 8a and 8b show a flow charts for illustrating steps carried out by the topic determiner shown in FIG. 3.

Thus, once the text processor 3 has completed processing of the text, then, at step S1 in FIG. 8a, the lexical chain determiner 41 of the topic determiner identifies a first noun in the tagged text store and, at step S2, accesses the lexical database in the lexical database store to locate the identified noun, then checks whether the located noun forms part of a noun set (that is a set of nouns sharing a relationship, such as a lexical relationship, for example a set of synonyms or a set of nouns sharing a hypernym) and, if so, associates that noun with that noun set and adds one to a count for that hypernym or noun set.

Then, at step S3, the lexical chain determiner 41 checks to see whether there are other nouns to be identified in the tagged text store 35 and repeats steps S1 to S3 until each of the nouns in the tagged text store 35 has been check and identified.

Figure 8B:
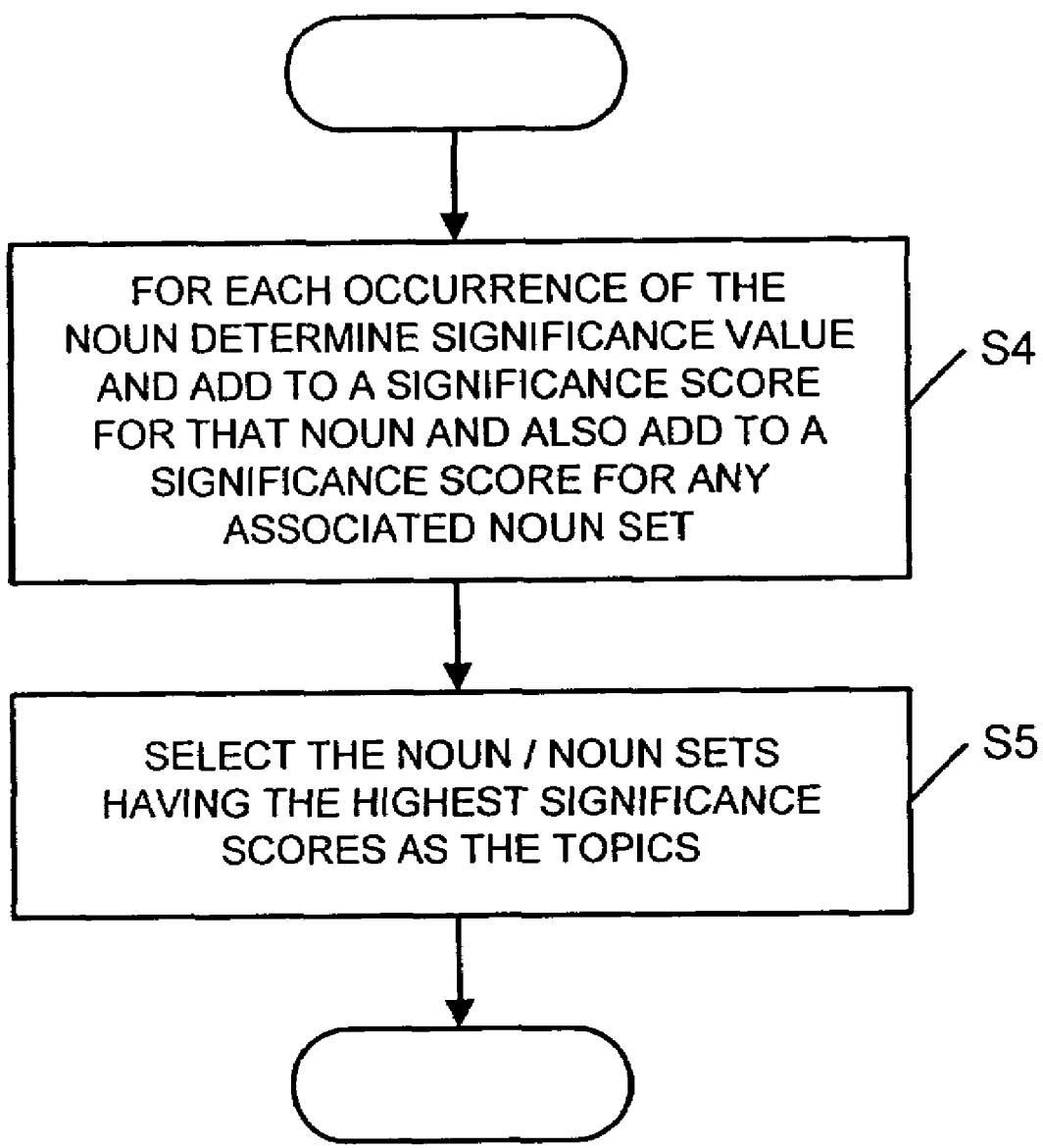

FIG. 8b shows the steps carried out by the significance determiner 43 and the topic identifier 44 for each identified noun and noun set.

Thus, at step S4, for each occurrence of an identified noun, the significance determiner 43 determines a significance value for that noun and adds that significance value to a significance score for that noun and also to a significance score for any noun set within which that noun falls. At the end of this process, a final significance score will be obtained for each identified noun and each noun set.

Then, at step S5, the topic identifier 44 selects the three highest significance scores and identifies the noun or noun set associated with each of the three highest significance scores as the topics of the text.

Figure 9:
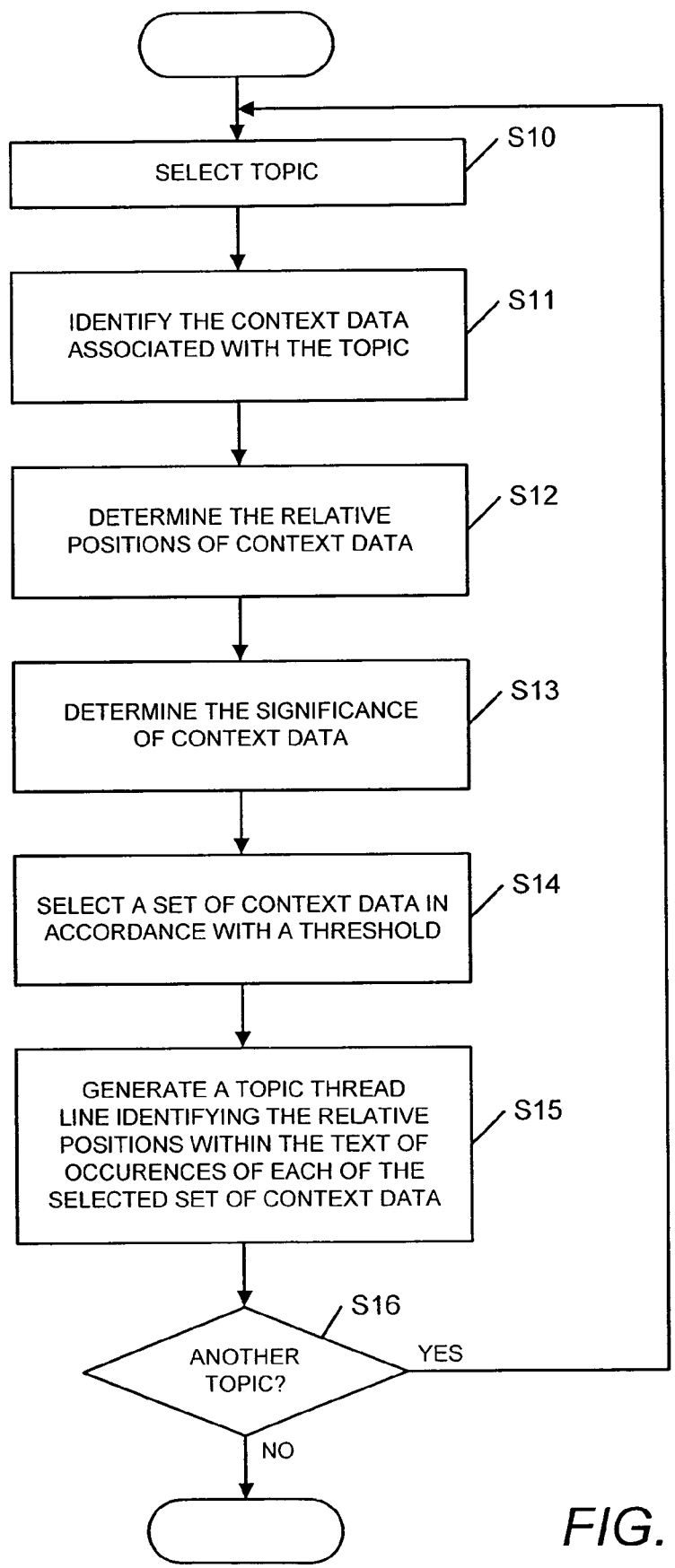
FIG. 9 shows a flow chart illustrating further steps carried out by the topic thread determiner shown in FIG. 4.

FIG. 9 shows the steps then carried out by the topic thread determiner 5. Thus, at step S10, the topic selector 50 selects one of the three topics identified by the topic identifier 44 and then, at step S11, the context data identifier 51 identifies, from the data stored in the phrase store 38, the context data associated with the noun or noun set of the topic. Where the topic is defined as a single noun that occurs a number of times throughout the text, then the context data identifier 51 determines the phrases within the determined phrase store 38 that include that noun and identifies the context data within those phrases. Where, however, the topic is defined by a hypernym or other noun set, then the context data identifier determines the nouns associated with that noun set in the text from the data provided by the topic determiner and then identifies the context data in the phrases containing those nouns.

Then, at step S12, the context data position determiner 52 determines the relative positions within the text of each identified item of context data by determining the word number (where the first word in the text is at word number 0) within the text for each context data. Then, at step S13, the context data significance determiner determines the significance of each item of context data by obtaining a weighted count or score with the weight for each occurrence of an item of context data being determined by its position in the text as discussed above. At step S14, the topic thread generator 54 selects a set of the most significant identified items of context data in accordance with a threshold which, as will be described below, may be preset at a default value or may be adjusted by the controller 9, for example by user input via the user input 90.

Then, at step S15, the topic thread generator 54 generates data representing a topic as a thread or line having at one end a topic heading and having nodes or positions distributed along the line associated with visual indicia identifying corresponding items of context data with the distribution, that is the relative. positions, of the indicia along the line representing the relative positions of the items of context data within the text. In addition, the topic thread generator causes the visual indicia representing the items of context data to have an appearance that is dependent upon the significance of the item of context data.

The topic heading or label will depend upon the type of topic. Where the topic is identified by a single noun, then that noun will be used as the topic heading or label. Where, however, the topic is identified by a noun set, that is a group of nouns that have a lexical relationship, for example the nouns are synonyms of one another or share a hypernym, then the topic heading or label will be determined by the type of lexical relationship. For example, where the members of a noun set are synonyms, then the most frequently occurring noun in the set may be chosen as the topic heading or, if all nouns have the same frequency, the noun in the set having the highest individual significance score may be selected. Where the noun set is a group of nouns sharing a common hypernym, then the meaning word in the WordNet database representing that hypernym may be selected as the topic heading or the most predominant noun, that is the noun having the highest significance score, may be selected as the noun heading.

Then at step S16, the topic thread generator 54 checks whether threads have been generated for all three, in this example, identified topics and if not repeats steps S10 to S15.

Figure 11A:
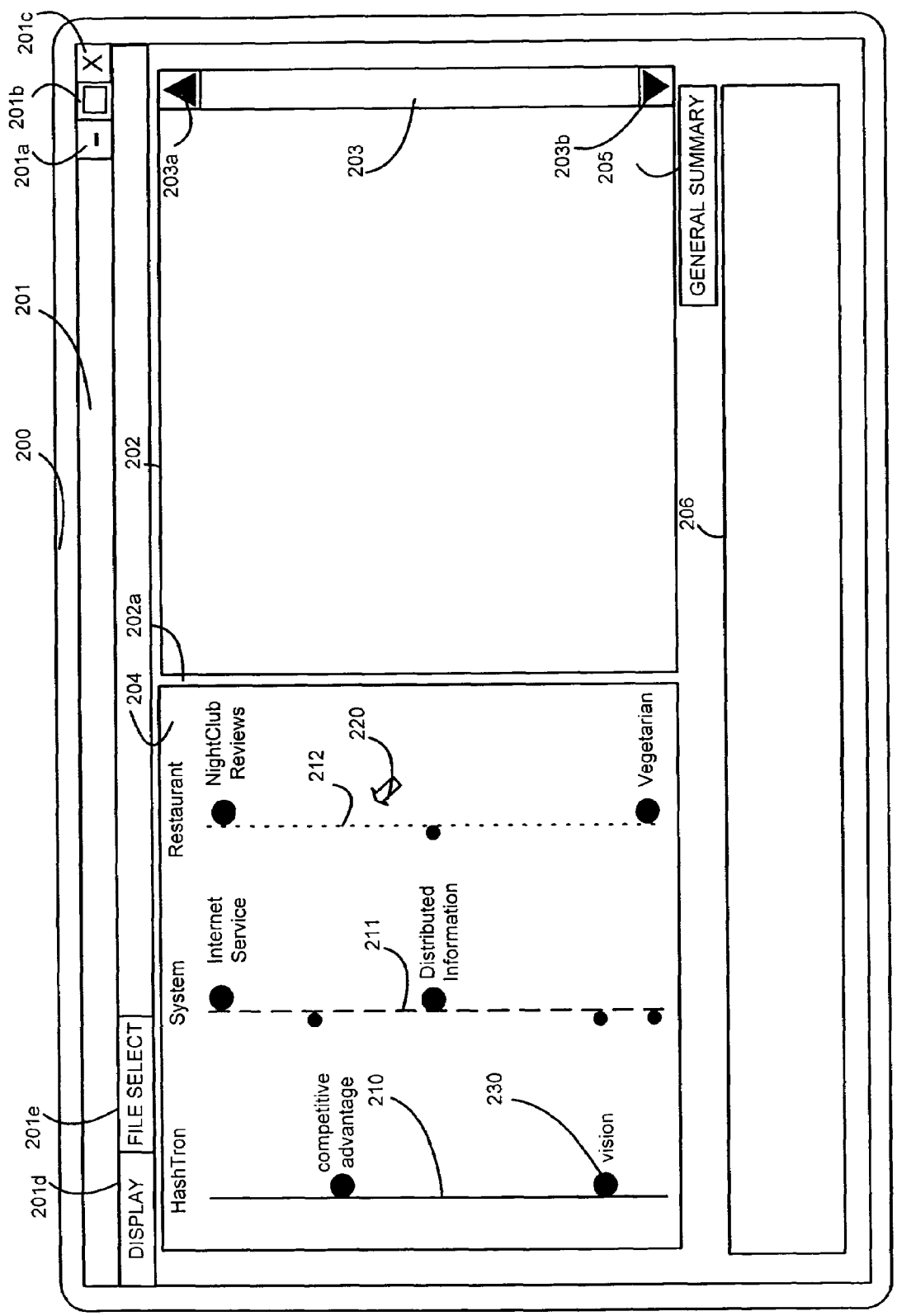
FIGS. 11a, 11b, 12a, 12b, 13 and 14 show different examples of display screens that may be displayed to the user by a display driver shown in FIG. 1.

FIG. 11a shows one example of a display screen 200 displayed to the user by the display 8.

The display screen 200 has a windows type configuration with a title bar 201 having minimise, full size and close buttons 201a, 201b, 201c. Beneath the title bar is a drop-down menu 201d entitled "display" and two side-by-side windows, a topic thread display window 204 and a text display window 202. The text display window 202 is associated with a scroll bar 203 having scroll up and scroll down arrows 203a and 203b for enabling a user to scroll through the text using the pointing device.

A third, summary display window 206 is positioned beneath the topic thread and text display windows 204 and 202. The summary display window 206 is associated with a general summary button 205.

In this example, the display screen 200 shown in FIG. 11a is generated by the display driver 7 once it has received the generated topic threads from the topic thread determiner 5.

Operation of the summarisation apparatus as described above may be initiated by the user from another window. Alternatively, a further drop-down menu 201e entitled "file select" in FIG. 11a may be provided that enables the user to select a file for summarisation.

In this example, the text selected for summarisation is set out below:

"Distributed Information System

HashTron has decided to make an investment in an Internet service offering restaurant and nightclub reviews in major cities across the nation.

In the meeting, Andrew Daborn, Chairman of HashTron, said that HashTron's competitive advantage was its expertise in networks.

Research has shown that people have difficulty finding good restaurants, even though they can often be found in local areas. This demand for locally relevant information cannot always be met by big centralised services. This is the reason that Daborn emphasises the critical role of a distributed information system.

HashTron's vision of a Distributed Information System is about interconnecting different databases around the country to provide information that the user needs when they need it.

The system combines information about the user (e.g. food preferences, GPS data) with information about restaurants. It can recommend for example only vegetarian restaurants within a 1 mile area to your PDA or mobile phone."

In this case, the summarisation apparatus has identified the topic headings as "HashTron", "System" and "Restaurant".

The topic headings are indicated at the top of the corresponding topic thread lines 210, 211, 212 in FIG. 11a and the relative locations of items of context data are represented on the thread 210, 211 or 212 by visual indicia 220, which, in this case, are in the form of geometrical shapes, in this example circles or dots, with the relative significance of occurrence of an item of context data being represented by the size of the circle so that the bigger the circle the greater the significance of the item of context data. As shown in FIG. 11a, the more significant items of context data may also be displayed on the topic thread line. Thus, for the text given above, the items of context data, "competitive advantage", and "vision" are specifically displayed for the topic heading "HashTron" while the items of context data "Internet service" and "Distributed Information" are displayed for the topic heading "Systems" and the items of context data "Night Club Reviews" and "Vegetarian" are shown for the topic heading "Restaurant".

In addition, the topic thread lines 210, 211 and 212 and their associated visual indicia are visually distinguishable from one another. In practice, this is achieved by allocating different colours (for example, red, green and blue, respectively), to the topic thread line. This is indicated diagrammatically in FIG. 11a by the topic thread line 210 being shown as the solid line, the topic thread line 211 being shown as a dashed line and the topic thread line 212 being shown as a dotted line.

A cursor 220 (shown as an arrow in FIG. 11a) may be positioned by the user on any of the visual indicia shown in FIG. 11a.

Figure 11B:
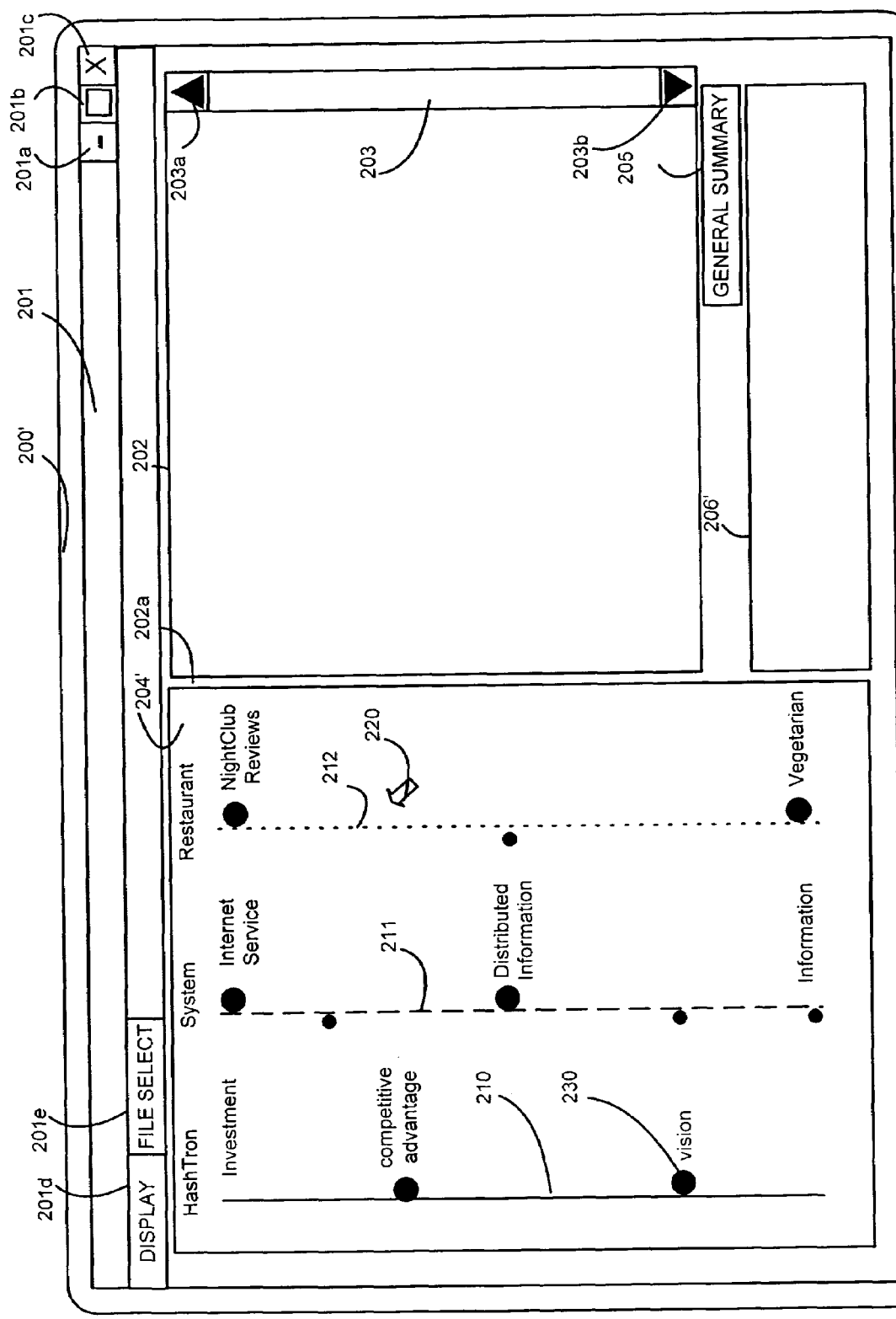

FIG. 11b shows a modified version 200' of the display screen 200 shown in FIG. 11a. The display screen shown in FIG. 11b differs from that shown in FIG. 11a in that the topic display window 204' is enlarged and the summary display window 206' is reduced in size so that the summary display window 206' is located entirely beneath the text display window 202 and the topic thread display window 204' extends beside the two other windows 202 and 206'. This provides a greater area of display in which to show the topic threads and also ensures that the user does not mistakenly assume that the relative locations of the visual indicia in the topic thread display window 204' correspond to text positions shown in the text display window.

Figure 12A:
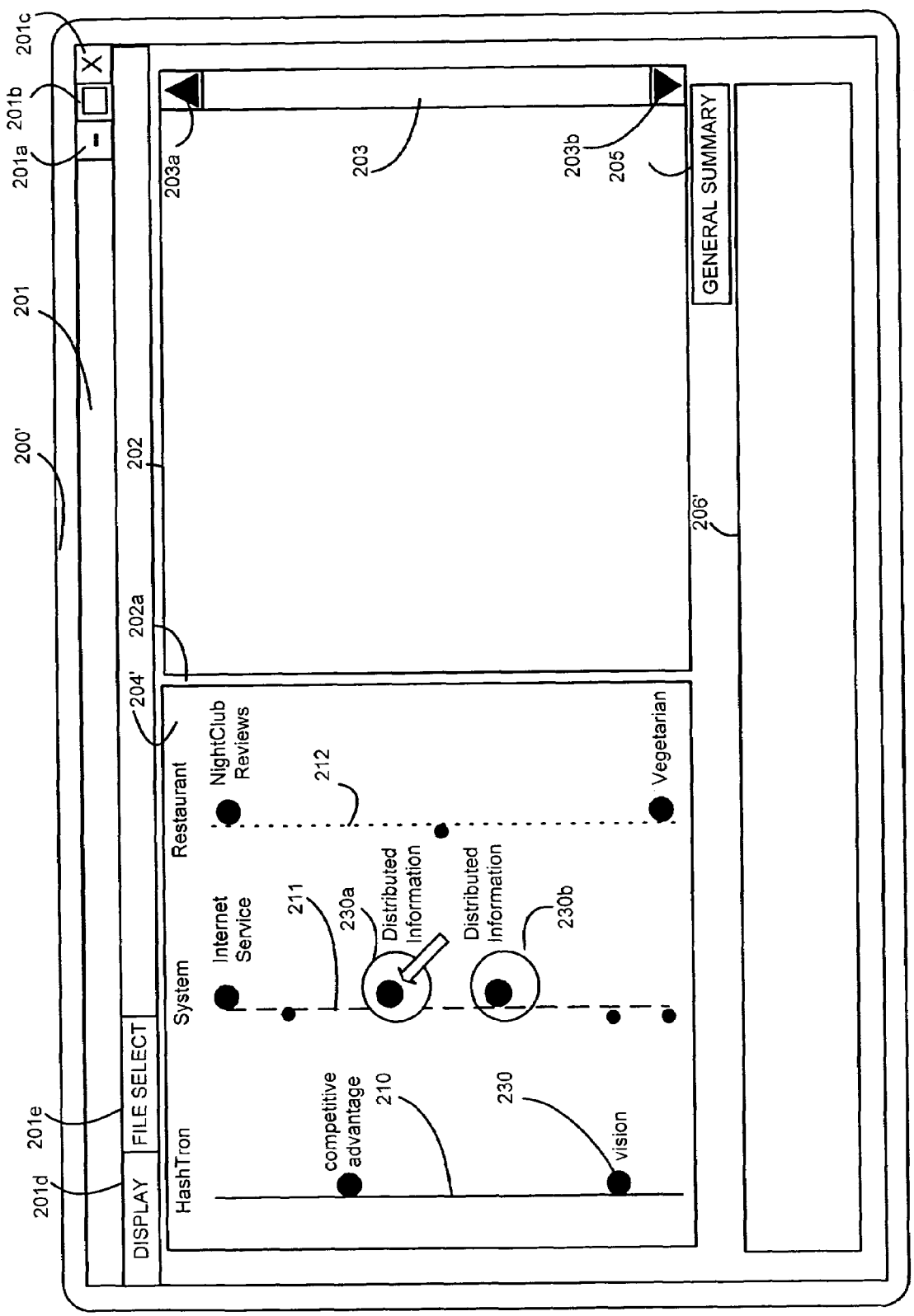

When the display driver 7 determines that the cursor has been positioned over an indicia 230, then the display driver 7 causes that indicia to be highlighted. This is indicated in FIG. 12a (for the display screen 200 shown in FIG. 11a) by the circle around the indicia 230a associated with the context data "Distributed Information" for the thread line 212, although in practice the highlighting may be effected by changing the colour of the indicia or causing it to flash. In addition, the display driver 7 causes any other visual indicia on the same thread line associated with the same context data to be highlighted and the corresponding context data to be displayed so that the user can easily identify each and every occurrence of that context data within the text and the relative locations at which those items of context data occur. Thus as shown in FIG. 12a, when the user positions the cursor over the visual indicia 230a associated with the context data "Distributed Information" then one further visual indicia 230b is highlighted and the associated context data "Distributed Information" displayed.

Figure 12B:
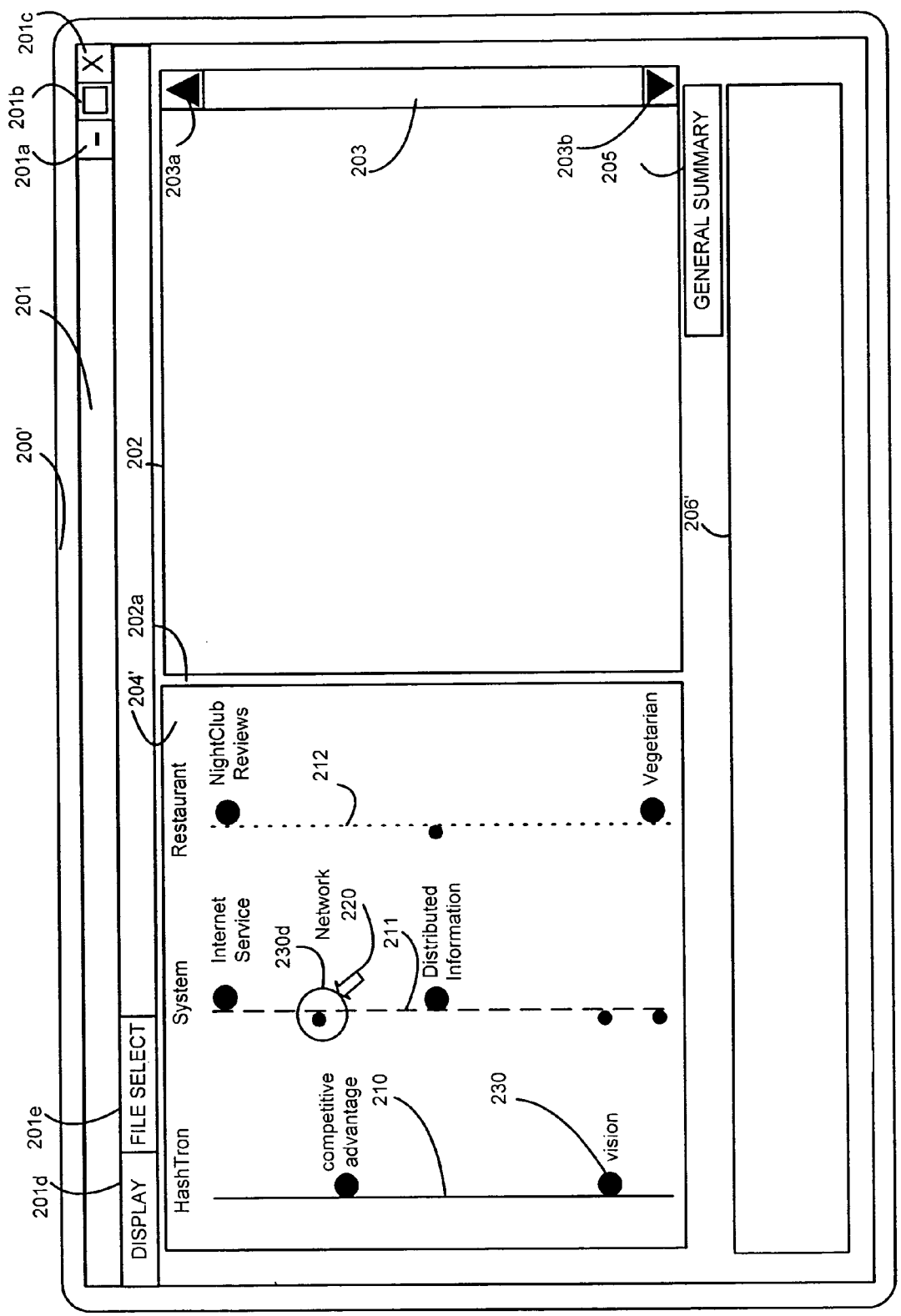
Figure 13:
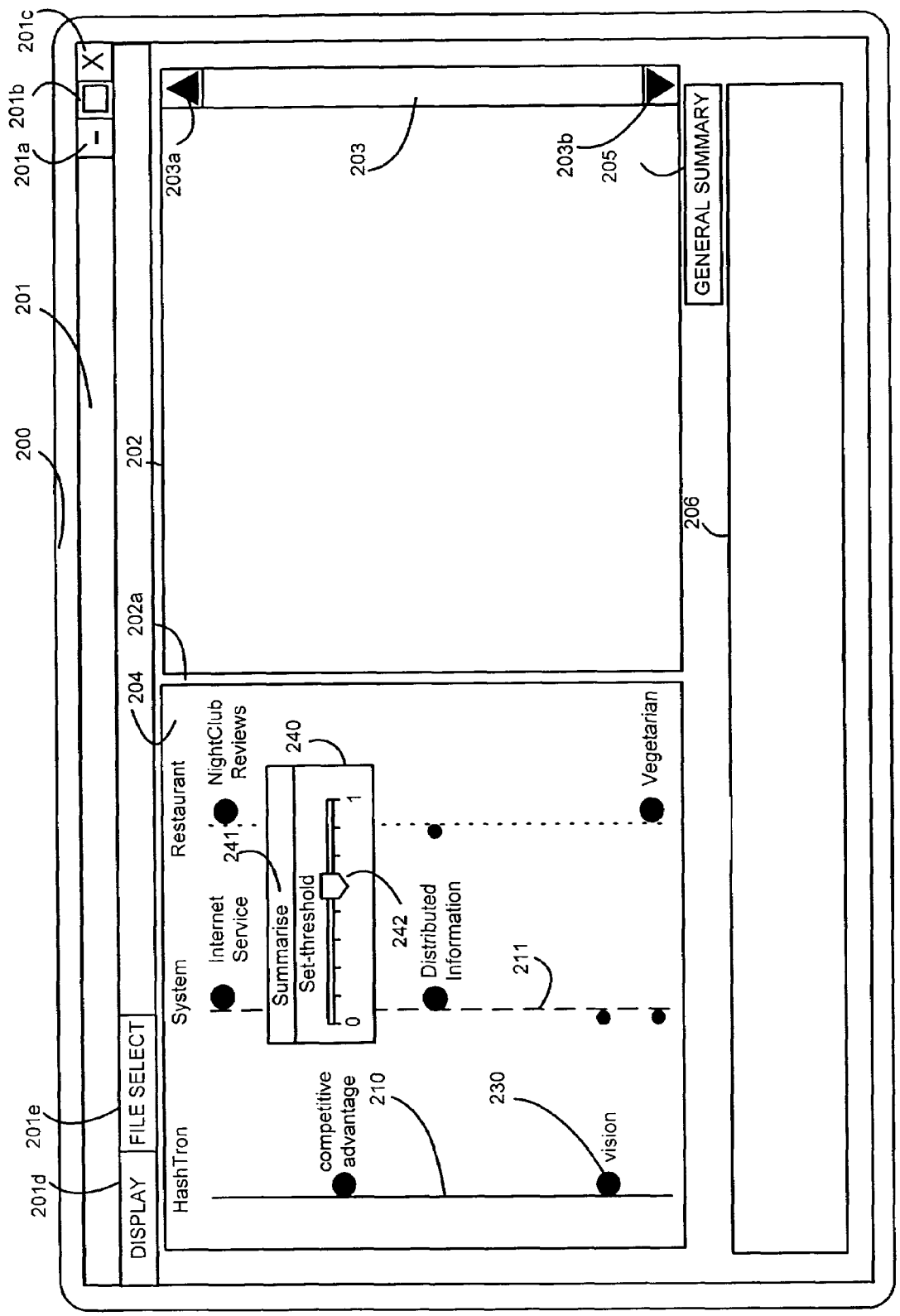

FIG. 12b illustrates the operation of the display provider when the user positions the cursor 220 over a visual indicia for which the associated context data is not normally displayed. As can be seen from FIG. 12b, positioning the cursor over such a visual indicia 230d causes the visual indicia to be highlighted (as indicated by the surrounding circle in FIG. 12b) and also causes the context data to be displayed, in this case, the context data "Network".

Where a large number of items of context data are associated with a topic thread, then the visual indication provided by the topic thread display window may become cluttered. To alleviate this problem, the controller 9 can control the number of items of context data that are actually displayed with their visual indicia 230. Thus, as shown in FIG. 13, when a user selects any one of the visual indicia using the user input 90, for example by right clicking using a pointing device of the user input 90, a pop-up window 240 is displayed. The pop-up window has a button 241 labelled "summarise", the function of which will be described below and a slider 242 that can be dragged by the user using the pointing device in known manner to set a threshold anywhere between 0 and 1. When the user positions the slider 242 at one end of the sliding scale (in this example at the 0 end), then no items of context data are shown, that is only the visual indicia are displayed. As the user moves the slider towards the other end of the scale, then the display provider 7 causes more items of context data to be shown with the items of context data being selected being those which are the most significant. If the user positions the slider 242 at the right (the "1" end in FIG. 13), then all items of context data will be shown as illustrated. As a default, the slider is positioned at the 0.6 position along the sliding scale.

Figure 14:
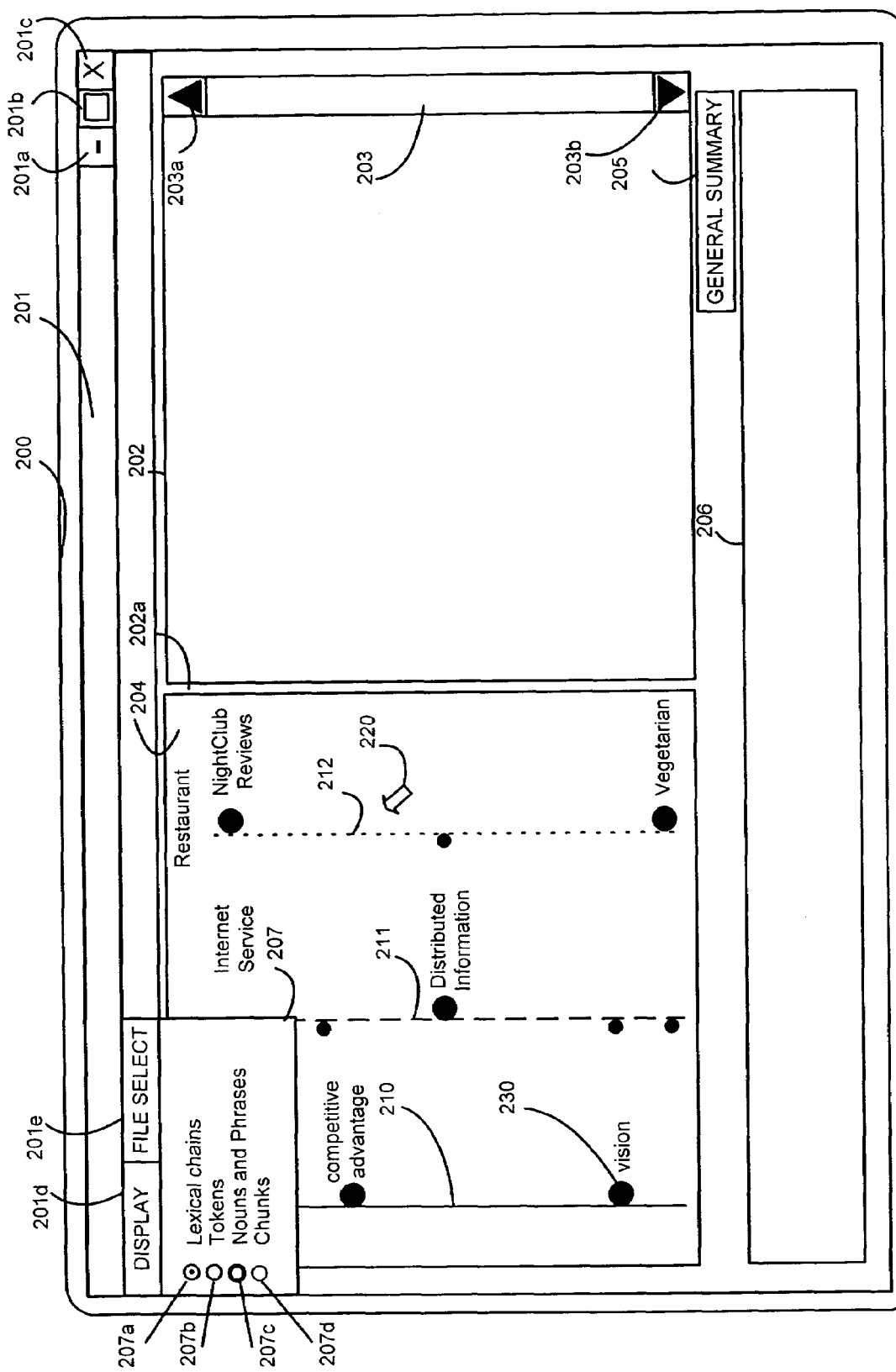

When the user selects the display menu 201d by positioning the cursor over the word "display" and clicking the selection button of the pointing device, then, as shown in FIG. 14, a drop-down menu 207 appears which has, in this example, four radio buttons 207a, 207b, 207c and 207d.

If the display provider determines that the user has selected the radio button 207b, then the display provider will cause the text being processed to be displayed in the text display window 202 with the individual tokens identified by the tokeniser (that is the individual tagged words from the tagged word store 35) highlighted (for example, by blocks of a colour such as yellow). This enables the user to confirm that the tokeniser has correctly identified individual words.

If the user selects the radio button "nouns and phrases" then the display provider 7 causes the text being processed to be displayed in the text display window with the identified nouns and phrases highlighted in different colours, for example, purple and blue. This is illustrated below for part of the example text given above showing the phrases in square brackets. "[HashTron's vision] of a Distributed [Information System] is about interconnecting different [databases] around the [country] to provide [information] that the [user] needs when they need it."

This enables the user to assess the noun and phrase identification conducted by the text processor to check its accuracy.

Similarly if the user selects the radio button "chunks" then the display provider causes the text to be displayed in a text display window with the identified phrases or chunks highlighted for example by blocking them in a colour such as blue. This is illustrated for part of the example text given above, showing the chunks in square brackets.

"[HashTron's vision] of a [Distributed Information System] is about [interconnecting different databases around the country] to provide [information that the user needs] when they need it."

If the user selects the radio button "lexical chains" 207A then the display provider causes the text displayed in the text display window 202 to show the identified lexical chains highlighted in a manner that associates them with the corresponding topic thread, for example by blocking them in the same colour, red, green and blue in the above example. One example of a lexical chain in the example text given above is set out below.

"System: an Internet service, network, distributed information system, information."

Figure 10:
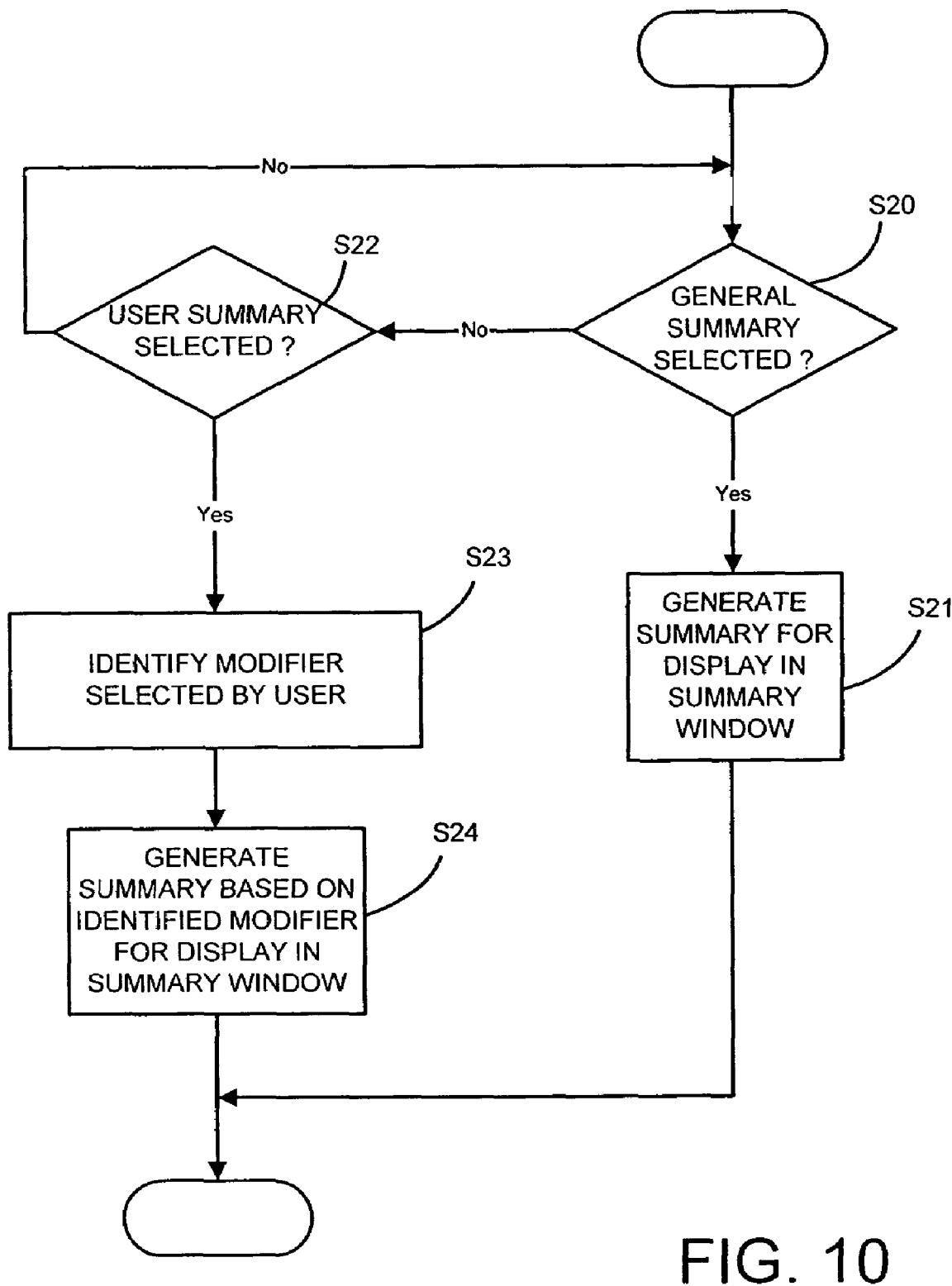
FIG. 10 shows a flow chart for illustrating steps carried out by the summariser shown in FIG. 5.

The user may also request the apparatus to produce a summary by using the user input 90. FIG. 10 shows a flow chart illustrating steps carried out by the summariser 6. Thus, when, at step S20 in FIG. 10, the controller 9 supplies data indicating that the user has selected the general summary button 207 shown in FIG. 11a or 11b, then the summariser 6 produces a general summary of the text being processed in accordance with a known method such as described in the above-mentioned documents by Edmundson or Johnson et al so as to extract the salient sentences from the document. The display provider 7 then causes the summary to be displayed in the summary display window 206.

The following is an example of a general summary produced from the text set out above:

"Distributed Information System. HashTron has decided to make an investment in an Internet service offering restaurant and nightclub reviews in major cities across the nation."

If, however, the user does not select the general summary button 205 but rather positions the cursor 230 over a visual indicia as shown in FIG. 13 and then selects the "summarise" button 241 by use of the pointing device, then the controller 9 passes to the summariser 6 instructions to summarise the text on the basis of the topic of the thread line with which the visual indicia is associated and also based on the particular selected context data. This causes the summariser to extract for the summary only the sentences related to this selected topic and containing that context data. A summary containing all sentences relevant to a topic can also be obtained by a user by, instead of selecting a visual indicia or node on a topic thread line, selecting the topic heading that is in this case "HashTron", "System" or "Restaurant". This enables a user easily to extract or view the portion of the text related to a particular one of the topics in the summary display window 206.

The following is an example of the summary produced when the user selects the context data "Distributed Information" and the summarise button 241 is clicked.

"Distributed Information System. HashTron's vision of a Distributed Information System is about interconnecting different databases around the country to provide information that the user needs when they need it."

The relative sizes of the topic thread display window 204 and the text display window 202 shown in FIGS. 11a to 14 may be adjusted by, in known manner, positioning the cursor 220. over a separator bar 202a and dragging the separator bar 202a to the required location using the pointing device. This enables, for example, the user to enlarge the topic thread display window 204 so as to view the topic threads more clearly to obtain an overall impression of the document and to enlarge the text display window 202 relative to the topic thread display window 204 if the user wishes to view the entire text, for example, to check the selection of the lexical chains, chunks, nouns and phrase and so on.

In the above described embodiments, the display dropdown menu 207 enables the user to view various stages in the operation of the summarising apparatus. The display of this information may be particularly useful for a person skilled in the art of producing summaries because it enables them to check the operation of the summarisation apparatus. However, if the apparatus is intended for use by an end user who is not him or herself skilled in the art of summarising documents, then this feature may be omitted.

In the above described examples, selecting a topic thread heading (or node) and clicking on the "summarise" button 241 causes a summary containing only the sentences relevant to that topic (or context data) to be displayed in the summary window 206. As another possibility, instead of producing a summary in the summary window 206, the display provider may cause the relevant sentence to be highlighted within the text display window 202. In this case, where more than one sentence is involved, then the display provider may display and highlight the first sentence and provide the user with a pop-up menu that enables the user to move from that sentence to the next sentence and so on so that the user can quickly move through the text from sentence to sentence containing the selected item or items of context data.

In the above described embodiments, the topic thread lines are displayed as vertical lines with the visual indicia or nodes illustrated by circles of varying sizes. The topic thread lines may be displayed in other orientations, for example, horizontally. However, it is advantageous for the topic thread lines to be arranged in the same orientation as that in which the user can scroll through the text document so that the user can get an idea from the relate positions of the visual indicia or nodes on the topic thread line of the positions of the corresponding sentences in the full text.

As another possibility the topic threads may be shown as bar charts extending in the scroll direction with the length of the bars indicating the relative significance of the items of context data. Other forms of topic thread display may be used such as Pie charts, scatter plots and the like. Also, where bars or lines are used they need not necessarily be rectilinear but could be curved.

In the above described examples, the actual text can be displayed adjacent the topic thread lines. This need not necessarily be the case and, for example, the actual text may be displayed in a different window display screen or may not be displayed at all.

In the above described examples, as shown in FIGS. 11a to 14, the entirety of the topic threads are shown in the topic thread display window. As another possibility, the topic thread display window may be associated with the scroll bar similar to that shown in FIG. 11a for the text display window 202 enabling the topic threads to be longer than the space provided by the topic thread window. The topic thread display window scroll bar may be ganged or coupled to the text display window scroll bar 203 so that, when the user uses the scroll bar 203 to scroll through the text, the topic thread display is also scrolled. As another possibility, the topic thread display window need not have a scroll bar. Rather, the text display scroll bar 203 may be configured to cause the topic thread display to scroll with the text display. The display may also be provided with zoom functions that enable a user to zoom into or out of the text so that, at one zoom level, the entirety of the text and the entirety of the topic threads may be displayed in the respective windows and, at another higher zoom level, only a portion of the text and only a portion of the topic threads may be displayed with, in this case, scroll bars being provided to enable the user to scroll through the text.

In the above-described examples, the distribution of the indicia or nodes along the threads is linear and the relative locations of the nodes indicate the relative locations of the corresponding context data in the text. The distribution may, however, be non-linear so that the scale (that is the relative spacing of the nodes) is relatively increased or decreased in certain regions of the thread. For example, the scale may be relatively enlarged so as to increase the separation between nodes that would otherwise be clustered close together, so increasing the ease with which the user can distinguish these nodes. As another possibility, the scale may be relatively enlarged in the regions of the thread containing the nodes associated with the context data of greatest significance.

In the above described examples, when a user selects a node or visual indica, the associated item of context data is displayed if it is not already displayed. As another possibility, selecting a node or indicia may cause a pop-up window to appear in which the sentence containing the context data or a number of sentences including and surrounding the sentence containing the context data is displayed.

In the above described examples, the context data is in the form of words or phrases that modify nouns. The context data may, however, be any words that are syntactically associated with the identified nouns.

In the above described examples, nouns within the text are identified. This need not necessarily be the case and the words that are identified may be phrases, verbs and so on. In addition, in non-European languages such as Japanese or Chinese, the parts-of-speech identified may be individual characters or groups of characters.

In the above described examples, topics are identified by identifying words, in example described nouns, that are related to one another by rules defined by a lexical database such as Wordnet. Other rules for defining relationships between identified words may, however, be used.

In the above described embodiments, the lexical chain determiner may identify as a noun set nouns that share a hypernym. In the hierarchical structure of a lexical database such as Wordnet, there may be many hierarchical levels and the top most hypernym may be too general or vague to provide a user with any significance information. Accordingly, the lexical chain determiner may be configured so as to constrain the number of levels of the hierarchical structure through which it can operate so that, for example, the lexical chain determiner may be arranged to identify as hypernyms only words in the next level up in the hierarchical tree structure from the identified word or may be constrained to check through only a preset number of levels. As a further possibility, the lexical database may contain markers or pointers that identify words of meaning which can be identified as hypernyms.

In the above described examples, the user has the ability to adjust the threshold that determines the number of items of context data that are displayed on the topic thread. As a further possibility, the controller 9 may be configured to adjust this threshold automatically in accordance with, for example, the number of items of context data identified for a topic so that, for example, a preset proportion of the number of identified items of context data are displayed. As another possibility, the controller 9 may be configured to adjust the number of items of context data displayed in accordance with the available area of the display window so that a larger number of items of context data may be displayed on a topic thread line where the display has a larger area. As a further possibility, where the user has the facility to adjust the size of the topic thread display window, then the controller may automatically vary the threshold to change the number of displayed items of context data in accordance with the current size of the topic thread display window.

In the above described examples, the significance determiner 43 and the context data significance determiner 53 determine the significance of a word or context data using a weighting function which is determined by the frequency of occurrence and position of the word or context data within the text. One or both of the significance determiners 43 and 53 may also apply weighting factors determined by the formatting of the word or context data in the text so that words shown in bold, capitals or otherwise emphasised have a higher weighting function than words shown in normal type. As a further possibility, the significance determiners 43 and 53 may use any combination of these weighting factors. As another possibility, one or both of the significance determiners may determine the significance solely on the frequency of occurrence of the word or context data within the text.

As another possibility, or additionally, known contextual understanding techniques may be used to determine the significance of words and/or context data for example natural language, interpretation in context and/or semantic analysis techniques may be used to enable significance to be determined at least partly in accordance with a deeper level of understanding of the text.

In the above described examples, when a user selects a visual indicia, a pop-up window may appear displaying the sentence or group of sentences (for example a paragraph) containing that item of context data. As another possibility, the pop-up window may display a summary weighted to that item of context data.

The topic headings or labels may be selected in a number of different ways. For example, the most frequently occurring word in the lexical chain may be used, the word in the lexical chain having the highest level (that is the most general level) in the lexical database may be used, the word which forms the core of the chain may be used, or the word having the highest significance score (for example a word in the title of the document) may be used.

In the above described examples, the summarisation apparatus conducts the text processing as well as the subsequent topic identification and summarisation. This need not necessarily be the case and, for example, the text processing may be carried out by a completely independent apparatus which may be coupled to the topic determiner 4 via a network. Similarly, the topic determination apparatus comprising the topic determiner 4 and topic thread determiner 5 may be provided by a separate computing apparatus as may be the summariser 6. The user input 90 and display driver 7 may be provided by separate computing apparatus and implemented by, for example, browser or like software that enables the user to access the topic determination apparatus and/or the summariser 6 via a network such as the Internet.

As described above, the text provider 2 is a mass storage device storing documents already in electronic form. As another possibility the text provider may comprise computing apparatus including a scanner and optical character recognition software for enabling a hard copy document to be converted to electronic format. As another possibility, the text provider 2 may comprise a microphone input and speech recognition software that enables spoken text to be converted to an electronically readable form.

The invention claimed is:

1. Apparatus for providing a user with an indication of the content of a text, the apparatus comprising:
   receiving means for receiving text data;
   topic determining means for determining from the text data at least one topic;
   topic context data identifying means for identifying in the text data context data associated with the at least one topic determined by the topic determining means;
   topic context data position determining means for determining, for each item of context data identified by the topic context data identifying means, the actual position and order of that item of context data within the text;
   topic representation data providing means operable to provide topic representation data defining a graphical representation of the at least one topic in which are distributed visual indicia representing at least some of the context data with the distribution of the visual indicia indicating visually to the user the relative positions within the text data of the corresponding items of context data on the basis of the actual positions and order of the items of context data within the text as determined by the topic context data position determining means; and supplying means for supplying the topic representation data for enabling display of the at least one topic representation to a user.

2. Apparatus according to claim 1, further comprising significance determining means for determining the relative significance of context data associated with the at least one topic, wherein the topic representation data providing means is arranged to provide a graphical representation that provides a visual indication of the relative significance of occurrence of the context data.

3. Apparatus according to claim 1, wherein the topic representation data providing means is arranged to provide the topic representation data so that there is a linear relationship between the relative positions of the visual indicia of the graphical representation and the corresponding relative positions of the context data in the text data.

4. Apparatus according to claim 2, wherein the topic representation data providing means is arranged to provide topic representation data comprising data that determines the appearance of the visual indicia in accordance with the relative significance of the context data.

5. Apparatus according to claim 2, wherein the significance determining means is arranged to determine the significance of context data in accordance with at least one of frequency of occurrence in the text data, its position of occurrence in the text data and its appearance within the text data.

6. Apparatus according to claim 1, wherein the topic representation data providing means is arranged to provide topic representation data that defines the graphical representation as a line along which the visual indicia are distributed.

7. Apparatus according to claim 1, wherein the topic context data position determining means is operable to determine the actual position of an item of context data within the text on the basis of the number of words from the start of the text to that item of context data.

8. Apparatus according to claim 1, wherein the topic representation data providing means is arranged to provide topic representation data wherein the scale of distribution of the visual indicia is non-linear and is relatively enlarged in at least one of the following situations:

where the visual indicia are close together; and where the visual indicia are more significant.

9. Apparatus according to claim 1, further comprising selection means fir enabling a user to select a visual indicia; and highlighting means for causing any other visual indicia associated with the same context data as the selected visual indicia to be highlighted.

10. Apparatus according to claim 1, further comprising modifying means for modifying the visual indicia of a topic representation.

11. Apparatus according to claim 1, wherein:

the topic determining means is arranged to determine a number of different topics from the text data;

the topic context data identifying means is arranged to identify in the text data respective context data for each topic; and the topic representation data providing means is arranged to provide topic representation data defining a respective graphical representation for each topic.

12. Apparatus according to claim 1, wherein the topic determining means is arranged to determine from the text data at least one of the number of occurrences of the same lexical item and the number of occurrences of lexical items sharing a relationship and defining a lexical item set to identify the topic or topics in accordance with the highest such occurrences.

13. Apparatus according to claim 1, wherein the topic determining means is arranged to determine from the text data at least one of the number of occurrences of the same noun and the number of occurrences of nouns sharing a relationship and defining a noun set to identify the topic or topics in accordance with the highest such occurrences.

14. Apparatus according to claim 1, wherein the topic determining means is arranged to identify lexical chains in the phrase-identified text data and to identify as the topic or topics the lexical chain or chains having the highest number of components.

15. Apparatus according to claim 1, further comprising summarising means for generating a summary of the text and summary display means for causing the display to display the summary.

16. A method of providing a user with an indication of the content of a text, the method comprising processor means carrying out the steps of:

receiving text data;

determining from the text data at least one topic;

identifying in the text data context data associated with the at least one determined topic;

determining, for each identified item of context data, the actual order and position of that item of context data within the text;

providing topic representation data defining a graphical representation of the at least one topic in which are distributed visual indicia representing at least some of the context data with the distribution of the visual indicia indicating visually to the user the relative positions within the text data of the corresponding context data on the basis of the determined actual order and positions of the items of context data within the text; and supplying the topic representation data for enabling the at least one topic representation to be displayed to a user.

17. A method according to claim 16, further comprising the processor means determining the relative significance of context data associated with the at least one topic and providing a graphical representation that provides a visual indication of the relative significance of occurrence of the context data.

18. A method according to claim 16, wherein the actual position of an item of context data within the text is determined on the basis of the number of words from the start of the text to that item of context data.

19. A method according to claim 17, wherein the topic representation data comprises data that determines the appearance of the visual indicia in accordance with the relative significance of the context data.

20. A method according to claim 17, wherein the significance of context data is determined in accordance with at least one of frequency of occurrence in the text data, its position of occurrence in the text and its appearance within the text.

21. A method according to claim 16, wherein the topic representation data defines the graphical representation as a line along which the visual indicia are distributed with the relative positions of the visual indicia along the line representing the relative positions of the context of the context data in the text.

22. A method according to claim 16, wherein the topic representation data defines the graphical representation of the at least one topic so that there is a linear relationship between the relative positions of the visual indicia and the relative positions of the context data in the text.

23. A method according to claim 16, wherein the topic representation data is provided so that the scale of distribution of the visual indicia is non-linear and is relatively enlarged in at least one of the following situations:
where the visual indicia are close together; and where the visual indicia are more significant.

24. A method according to claim 16, further comprising enabling a user to select a visual indicia and highlighting any other visual indicia associated with the same context data as the selected visual indicia.

25. A method according to claim 16, further comprising modifying the visual indicia of a topic representation in response to at least one of user input and the topic representation data.

26. A method according to claim 16, wherein:
a number of different topics from the text data are determined;
respective context data is identified in the text data for each topic; and
the topic representation data is provided defining a respective graphical representation for each topic.

27. A method according to claim 16, further comprising the processor means determining from the text data at least one of the number of occurrences of the same lexical item and the number of occurrences of lexical items sharing a relationship and defining a lexical item set, to identify the topic or topics in accordance with the highest such occurrences.

28. A method according to claim 16, further comprising the processor means determining from the text data at least one of the number of occurrences of the same noun and the number of occurrences of nouns sharing a relationship and defining a noun set, to identify the topic or topics in accordance with the highest such occurrences.

29. A method according to claim 16, which comprises the processor means identifying lexical chains in the phrase-identified text data and identifying as the topic or topics the lexical chain or chains having the highest number of components.

30. A method according to claim 16, further comprising generating a summary of the text and causing the display to display the summary.

31. A method of providing a user with an indication of the content of a text, the method comprising processor means carrying out the steps of:
associating words in text data with part-of-speech identifiers to produce part-of-speech identified text data;
determining from the part-of-speech-identified text data at least one topic that occurs in the text;
identifying in the ten data context data associated with the at least one determined topic;
determining, for each identified item of context data, the actual order and position of that item of context data within the text;
providing topic representation data defining a graphical representation of the at least one topic in which are distributed visual indicia representing at least some of the context data with the distribution of the visual indicia indicating visually to the user the relative positions within the text data of the corresponding context data on the basis of the determined actual order and positions of the items of context data within the text; and
causing a display to display the topic representation.

32. A user interface comprising:
display means arranged to display a display region having first and second display areas adjacent to one another and configured to display in the first display area at least a portion of a text and to display in the second display area a graphical representation of a topic occurring in the text in which graphical representation are distributed visual indicia representing visually to the user context data associated with, that topic such that the relative positions within the text data of items of context data associated with the topic are determined by the actual order and positions of the items of context data within the text, the display means also being arranged to display a cursor in the display region and a scroll bar associated with the first display area;
user input means for receiving user input from a user input device and for moving the cursor in the display region in accordance with the user input; and
scrolling means for scrolling both the text in the first display area and the topic representation in the second display area when user input is received by the user input means that causes the cursor to move to input a scroll instruction.

33. Computer-executable program instructions stored on a computer-readable storage medium, the program instructions for programming processor means to provide a user with an indication of the content of a text, the program instructions when executed by the processor means causing the processor means to:
determine from the text data at least one topic;
identify in the text data context data associated with the at least one determined topic;
determine, for each identified item of context data, the order and actual position of that item of context data within the text;
provide topic representation data defining a graphical representation of the at least one topic in which are distributed visual indicia representing at least some of the context data with the distribution of the visual indicia indicating visually to the user the relative positions within the text data of the corresponding context data on the basis of the determined actual order and positions of the items of context data within the text; and
supply the topic representation data for enabling the at least one topic representation to be displayed to a user.

34. A computer-readable storage medium storing computer-executable program instructions to program a processor to cause the processor to provide a user with an indication of the content of a text, the program instructions when executed by the processor causing the processor to:
determine from the text data at least one topic;
identify in the text data context data associated with the at least one determined topic;
determine, for each identified item of context data, the actual order and position of that item of context data within the text;
provide topic representation data defining a graphical representation of the at least one topic in which are distributed visual indicia representing at least some of the context data with the distribution of the visual indicia indicating visually to the user the relative positions within the text data of the corresponding context data on the basis of the determined actual order and positions of the items of context data within the text; and supply the topic representation data for enabling the at least one topic representation to be displayed to a user.

35. Apparatus for providing a user with an indication of the content of a text, the apparatus comprising:

a part-of-speech associater for associating words in text data with part-of-speech identifiers to produce part-of-speech identified text data;

a topic determiner for determining from the pan-of-speech-identified text data at least one topic that occurs in to text data;

a topic context data identifier for identifying in the text data context data associated with the at least one topic determined by the topic determiner;

a topic context data position determiner for determining, for each item of context data identified by the topic context data identifier, the actual order and position of that item of context data within the text;

a topic representation data provider operable to provide topic representation data defining a graphical representation of the at least one topic in which are distributed visual indicia representing at least some of the context data with the distribution of the visual indicia indicating visually to the user the relative positions within the text data of the corresponding items of context data on the basis of the actual order and positions of the items of context data within the text as determined by the topic context data position determining means; and a display controller for causing a display to display the topic representation.

36. Apparatus for providing a user with an indication of the content of a text, the apparatus comprising:

a receiver for receiving text data;

a topic determiner for determining from the text data at least one topic;

a topic context data identifier for identifying in the text data context data associated with the at least one topic determined byte topic determiner;

a topic context data position determiner for determining, for each item of context data identified by the topic context data identifier, the actual order and position of that item of context data within the text;

a topic representation data provider operable to provide topic representation data defining a graphical representation of the at least one topic in which are distributed visual indicia representing at least some of the context data with the distribution of the visual indicia indicating visually to the user the relative positions within the text data of the corresponding items of context data on the basis of the actual order and positions of the items of context data within the text as determined by the topic context data position determiner; and a supplier for supplying the topic representation data for enabling display of the at least one topic representation to a user.

* * * * *

UNITED STATES PATENT AND TRADEMARK OFFICE
CERTIFICATE OF CORRECTION

PATENT NO. : 7,234,942 B2
APPLICATION NO. : 10/609419
DATED : June 26, 2007
INVENTOR(S) : Hu et al.

It is certified that error appears in the above-identified patent and that said Letters Patent is hereby corrected as shown below:

Title Page;
COVER SHEET, Page 2:
(56) Other Publications, After Barzilay, R., et al., "Intellig nt" should read -- Intelligent --; and
(56) Other Publications, After Brazilay, R., "of th" should read -- of the --.

COLUMN 1:
Line 56, "mean" should read -- means --.

COLUMN 2:
Line 23, "of computing" should read -- of a computing --; and
Line 27, "show a flow charts" should read -- show flow charts --.

COLUMN 6:
Line 60, "check" should read --checked --.

COLUMN 7:
Line 47, "relative." should read -- relative --.

COLUMN 11:
Line 42, "220." should read -- 220 --.

COLUMN 15:
Line 52, "comprising" should read -- comprising: --.

COLUMN 17:
Line 59, "ten" should read -- text --.

COLUMN 18:
Line 15, "with, that" should read -- with that --.

UNITED STATES PATENT AND TRADEMARK OFFICE
CERTIFICATE OF CORRECTION

PATENT NO. : 7,234,942 B2
APPLICATION NO. : 10/609419
DATED : June 26, 2007
INVENTOR(S) : Hu et al.

It is certified that error appears in the above-identified patent and that said Letters Patent is hereby corrected as shown below:

COLUMN 19:
Line 13, "pan-of-" should read -- part-of- --; and
Line 15, "in to" should read -- in the --.

COLUMN 20:
Line 11, "byte" should read -- by the --.

Signed and Sealed this

Thirteenth Day of May, 2008

JON W. DUDAS
*Director of the United States Patent and Trademark Office*